(12) United States Patent
Nishio et al.

(10) Patent No.: US 12,542,571 B2
(45) Date of Patent: Feb. 3, 2026

(54) TERMINAL AND COMMUNICATION METHOD

(71) Applicant: Panasonic Intellectual Property Corporation of America, Torrance, CA (US)

(72) Inventors: Akihiko Nishio, Osaka (JP); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 405 days.

(21) Appl. No.: 17/772,115

(22) PCT Filed: Sep. 28, 2020

(86) PCT No.: PCT/JP2020/036678
§ 371 (c)(1),
(2) Date: Apr. 26, 2022

(87) PCT Pub. No.: WO2021/090607
PCT Pub. Date: May 14, 2021

(65) Prior Publication Data
US 2022/0407546 A1    Dec. 22, 2022

(30) Foreign Application Priority Data

Nov. 7, 2019    (JP) ................................ 2019-202108

(51) Int. Cl.
*H04W 72/23*   (2023.01)
*H04B 1/06*    (2006.01)
(Continued)

(52) U.S. Cl.
CPC ................. *H04B 1/06* (2013.01); *H04B 1/40* (2013.01); *H04B 7/10* (2013.01); *H04W 16/28* (2013.01); *H04W 72/23* (2023.01); *H04W 76/10* (2018.02)

(58) Field of Classification Search
CPC ..... H04W 76/10; H04W 16/28; H04W 72/23; H04B 1/06; H04B 1/40
See application file for complete search history.

(56) References Cited

U.S. PATENT DOCUMENTS

2015/0215013 A1    7/2015   Strong et al.
2015/0381282 A1   12/2015   Zhang et al.
(Continued)

FOREIGN PATENT DOCUMENTS

| CN | 107632310 A | * | 1/2018 | |
| EP | 4030855 A1 | * | 7/2022 | ............... H04B 7/10 |

(Continued)

OTHER PUBLICATIONS

3GPP, "3rd Generation Partnership Project; Technical Specification Group Radio Access Network; NR; NR and NG-RAN Overall Description; Stage 2 (Release 15)," 3GPP TS 38.300 V15.6.0, Jun. 2019, 99 pages.

(Continued)

*Primary Examiner* — Jinsong Hu
*Assistant Examiner* — Farideh Madani
(74) *Attorney, Agent, or Firm* — Seed Intellectual Property Law Group LLP

(57) ABSTRACT

This terminal is provided with: a control circuit that determines a polarized wave using at least one among first wireless communication and second wireless communication after the first wireless communication; and a communication circuit that performs at least one wireless communication using the determined polarized wave.

13 Claims, 17 Drawing Sheets

(51) Int. Cl.
*H04B 1/40* (2015.01)
*H04B 7/10* (2017.01)
*H04W 16/28* (2009.01)
*H04W 72/21* (2023.01)
*H04W 76/10* (2018.01)

(56) References Cited

U.S. PATENT DOCUMENTS

| 2015/0382318 | A1* | 12/2015 | Kim | G01S 5/0054 |
| | | | | 455/456.5 |
| 2016/0352413 | A1 | 12/2016 | Tani et al. | |
| 2018/0054251 | A1* | 2/2018 | Alex | H04B 7/18506 |
| 2018/0063693 | A1* | 3/2018 | Chakraborty | H04W 8/005 |
| 2019/0020123 | A1* | 1/2019 | Petersson | H01Q 25/001 |
| 2020/0092039 | A1* | 3/2020 | Wang | H04L 1/0036 |
| 2020/0212974 | A1* | 7/2020 | Wu | H04L 5/0051 |
| 2021/0084507 | A1 | 3/2021 | Takeda et al. | |

FOREIGN PATENT DOCUMENTS

| ES | 2535350 T3 * | 5/2015 | H04W 36/0005 |
| JP | 2004080353 A | 3/2004 | |
| JP | 2013-150268 A | 8/2013 | |
| JP | 6099773 B2 | 3/2017 | |
| WO | 2019/159370 A1 | 8/2019 | |
| WO | WO-2021058576 A1 * | 4/2021 | H04B 7/10 |

OTHER PUBLICATIONS

3GPP, "3rd Generation Partnership Project; Technical Specification Group Radio Access Network; Study on New Radio (NR) to support non-terrestrial networks (Release 15)," 3GPP TR 38.811 V15.2.0 Sep. 2019, 126 pages.

3GPP, "3rd Generation Partnership Project; Technical Specification Group Radio Access Network; Study on Scenarios and Requirements for Next Generation Access Technologies (Release 15)," 3GPP TR 38.913 V15.0.0, Jun. 2018, 39 pages.

3GPP, "3rd Generation Partnership Project; Technical Specification Group Services and System Aspects; System Architecture for the 5G System; Stage 2 (Release 16)," 3GPP TS 23.501 V16.1.0, Jun. 2019, 368 pages.

3GPP, "3rd Generation Partnership Project; Technical Specification Group Radio Access Network; NR; Physical channels and modulation (Release 15)," 3GPP TS 38.211 V15.6.0, Jun. 2019, 97 pages.

3GPP, "3rd Generation Partnership Project; Technical Specification Group Radio Access Network; NR; Multiplexing and channel coding (Release 15)," 3GPP TS 38.212 V15.6.0, Jun. 2019, 101 pages.

International Search Report, mailed Dec. 8, 2020, for International Application No. PCT/JP2020/036678, 5 pages.

Panasonic, "On physical layer control procedures for NTN," R1-1911003, Agenda Item: 7.2.5.2, 3GPP TSG RAN WG1 #98bis, Chongqing, China, Oct. 14-20, 2019, 4 pages.

Ericsson, "On physical layer control procedures for NTN," R1-1910981, Agenda Item: 7.2.5.2, 3GPP TSG-RAN WG1 Meeting #98bis, Chongqing, China, Oct. 14-20, 2019. (11 pages).

Extended European Search Report, dated Dec. 2, 2022, for European Patent Application No. 20885214.5-1206. (11 pages).

Communication pursuant to Article 94(3) EPC, dated Mar. 3, 2025, for the European Patent Application No. 20885214.5. (6 pages).

* cited by examiner

- 'QCL-TypeA': {Doppler shift, Doppler spread, average delay, delay spread}
- 'QCL-TypeB': {Doppler shift, Doppler spread}
- 'QCL-TypeC': {Doppler shift, average delay}
- 'QCL-TypeD': {Spatial Rx parameter}
- 'QCL-TypeE' : {Polarization}

FIG. 15

```
-- ASN1START
-- TAG-TCI-STATE-START
TCI-State ::=        SEQUENCE {
   tci-StateId         TCI-StateId,
   qcl-Type1           QCL-Info,
   qcl-Type2           QCL-Info
   ...
QCL-Info ::=         SEQUENCE {
   cell                ServCellIndex
   bwp-Id              BWP-Id
   referenceSignal      CHOICE {
      csi-rs              NZP-CSI-RS-ResourceId,
      ssb                 SSB-Index
   },
   qcl-Type            ENUMERATED {typeA, typeB, typeC, typeD, typeE},
   ...
}
-- TAG-TCI-STATE-STOP
-- ASN1STOP
```

FIG. 16

| Bit field mapped to index | codebookSubset = FullyAndPartialAndNoncoherent | Bit field mapped to index | codebookSubset = nonCoherent |
|---|---|---|---|
| 0 | 1 layer: TPMI = 0 | 0 | 1 layer: TPMI = 0 | ←—— 1 layer with RHCP
| 1 | 1 layer: TPMI = 1 | 1 | 1 layer: TPMI = 1 | ←—— 1 layer with LHCP
| 2 | 2 layers: TPMI = 0 | 2 | 2 layers: TPMI = 0 | ←—— 2 layers with RHCP and LHCP
| 3 | 1 layer: TPMI = 2 | 3 | reserved |
| 4 | 1 layer: TPMI = 3 | | |
| 5 | 1 layer: TPMI = 4 | | |
| 6 | 1 layer: TPMI = 5 | | |
| 7 | 2 layers: TPMI = 1 | | |
| 8 | 2 layers: TPMI = 2 | | |
| 9-15 | reserved | | |

FIG. 17

TERMINAL AND COMMUNICATION METHOD

TECHNICAL FIELD

The present disclosure relates to a terminal and a communication method.

BACKGROUND ART

In the standardization of 5G, New Radio access technology (NR) was discussed in 3GPP and the Release 15 (Rel. 15) specification for NR has been published.

CITATION LIST

Non-Patent Literature

NPL 1
3GPP, TR38.811 V15.2.0, "Study on New Radio (NR) to support non terrestrial networks (Release 15)," 2019 September NPL 2
3GPP TSG RAN WG1 #98bis, R1-1911003, "On physical layer control procedures for NTN," October, 2019

SUMMARY OF INVENTION

Technical Problem

However, there is scope for further study on a method for determining polarization used for radio communication in radio communication systems.

One non-limiting and exemplary embodiment facilitates providing a terminal and a communication method each capable of determining polarization used for radio communication.

A terminal according to an exemplary embodiment of the present disclosure includes: control circuitry, which, in operation, determines polarization to be used in at least one of first radio communication and/or second radio communication which is after the first radio communication; and communication circuitry, which, in operation, performs the at least one of the first radio communication and/or the second radio communication by using the determined polarization.

Note that these generic or specific aspects may be achieved by a system, an apparatus, a method, an integrated circuit, a computer program, or a recoding medium, and also by any combination of the system, the apparatus, the method, the integrated circuit, the computer program, and the recoding medium.

According to an exemplary embodiment of the present disclosure, it is possible to determine polarization used for radio communication.

Additional benefits and advantages of the disclosed exemplary embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 15 illustrates exemplary quasi co-location (QCL) Types;
FIG. 16 illustrates an exemplary radio resource control (RRC) message on a TCI state and the QCL;
FIG. 17 illustrates an example of Precoding information.

DESCRIPTION OF EMBODIMENTS

Hereinafter, embodiments of the present disclosure will be described in detail with reference to the accompanying drawings.
<5G NR System Architecture and Protocol Stack>
3GPP has been working on the next release for the 5th generation cellular technology (simply called "5G"), including the development of a new radio access technology (NR) operating in frequencies ranging up to 100 GHz. The first version of the 5G standard was completed at the end of 2017, which allows proceeding to 5G NR standard-compliant trials and commercial deployments of terminals (e.g., smartphones).

Figure 1:
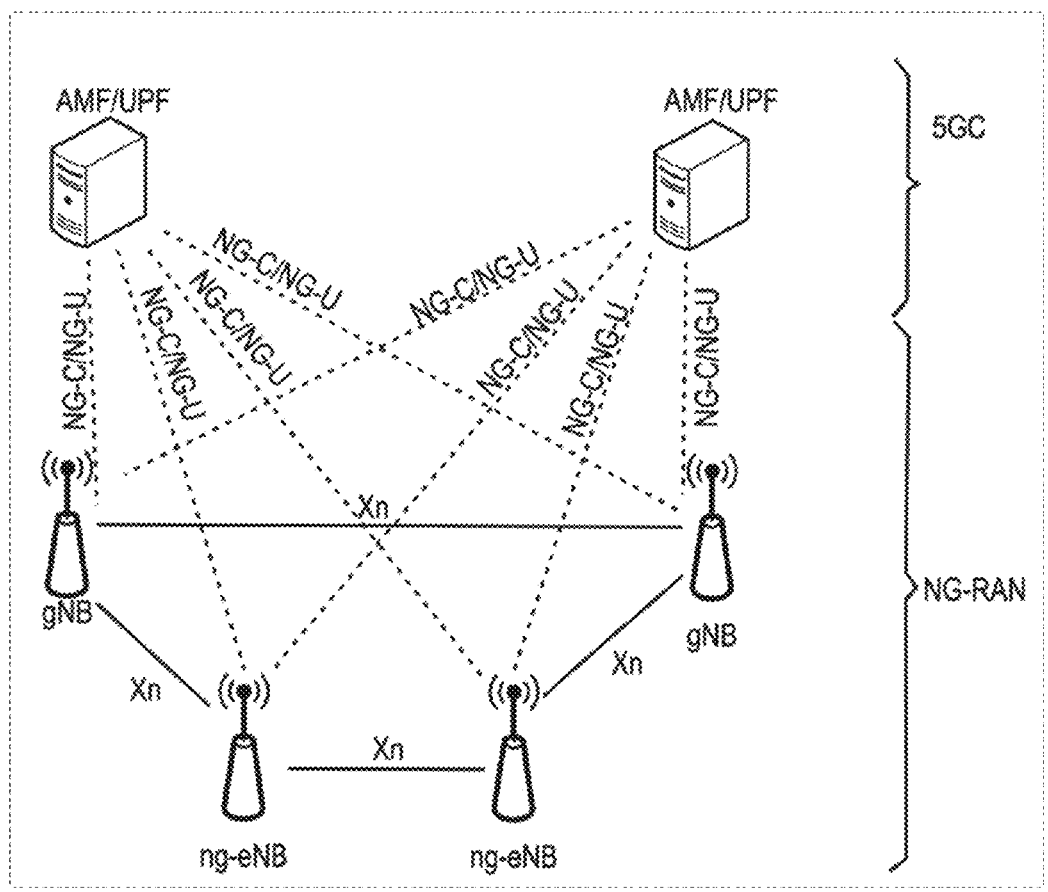
FIG. 1 illustrates an exemplary architecture of a 3GPP NR system.

For example, the overall system architecture assumes an NG-RAN (Next Generation-Radio Access Network) that includes gNBs, providing the NG-radio access user plane (SDAP/PDCP/RLC/MAC/PHY) and control plane (RRC) protocol terminations towards the UE. The gNBs are interconnected with each other by means of the Xn interface. The gNBs are also connected by means of the Next Generation (NG) interface to the NGC (Next Generation Core), more specifically to the AMF (Access and Mobility Management Function)(e.g., a particular core entity performing the AMF) by means of the NG-C interface and to the UPF (User Plane Function) (e.g., a particular core entity performing the UPF) by means of the NG-U interface. The NG-RAN architecture is illustrated in FIG. 1 (see e.g., 3GPP TS 38.300 v15.6.0, section 4).

The user plane protocol stack for NR (see e.g., 3GPP TS 38.300, section 4.4.1) includes the PDCP (Packet Data Convergence Protocol, see clause 6.4 of TS 38.300), RLC (Radio Link Control, see clause 6.3 of TS 38.300) and MAC (Medium Access Control, see clause 6.2 of TS 38.300) sublayers, which are terminated in the gNB on the network side. Additionally, a new Access Stratum (AS) sublayer (SDAP, Service Data Adaptation Protocol) is introduced above the PDCP (see e.g., clause 6.5 of 3GPP TS 38.300). A control plane protocol stack is also defined for NR (see for instance TS 38.300, section 4.4.2). An overview of the Layer 2 functions is given in clause 6 of TS 38.300. The functions of the PDCP, RLC, and MAC sublayers are listed respectively in clauses 6.4, 6.3, and 6.2 of TS 38.300. The functions of the RRC layer are listed in clause 7 of TS 38.300.

For instance, the Medium-Access-Control layer handles logical-channel multiplexing, and scheduling and scheduling-related functions, including handling of different numerologies.

The physical layer (PHY) is for example responsible for coding, PHY HARQ processing, modulation, multi-antenna processing, and mapping of the signal to the appropriate physical time-frequency resources. The physical layer also handles mapping of transport channels to physical channels. The physical layer provides services to the MAC layer in the form of transport channels. A physical channel corresponds to the set of time-frequency resources used for transmission of a particular transport channel, and each transport channel is mapped to a corresponding physical channel. Examples of the physical channel include a Physical Random Access Channel (PRACH), a Physical Uplink Shared Channel (PUSCH), and a Physical Uplink Control Channel (PUCCH) as uplink physical channels, and a Physical Downlink Shared Channel (PDSCH), a Physical Downlink Control Channel (PDCCH), and a Physical Broadcast Channel (PBCH) as downlink physical channels.

Use cases/deployment scenarios for NR could include enhanced mobile broadband (eMBB), ultra-reliable low-latency communications (URLLC), and massive machine type communication (mMTC), which have diverse requirements in terms of data rates, latency, and coverage. For example, eMBB is expected to support peak data rates (20 Gbps for downlink and 10 Gbps for uplink) and user-experienced data rates on the order of three times what is offered by IMT-Advanced. On the other hand, in case of URLLC, the tighter requirements are put on ultra-low latency (0.5 ms for UL and DL each for user plane latency) and high reliability (1-10-5 within 1 ms). Finally, mMTC may preferably require high connection density (1,000,000 devices/km$^2$ in an urban environment), large coverage in harsh environments, and extremely long-life battery for low cost devices (15 years).

Therefore, the OFDM numerology (e.g., subcarrier spacing, OFDM symbol duration, cyclic prefix (CP) duration, and number of symbols per scheduling interval) that is suitable for one use case might not work well for another. For example, low-latency services may preferably require a shorter symbol duration (and thus larger subcarrier spacing) and/or fewer symbols per scheduling interval (aka, TTI) than an mMTC service. Furthermore, deployment scenarios with large channel delay spreads may preferably require a longer CP duration than scenarios with short delay spreads. The subcarrier spacing should be optimized accordingly to retain the similar CP overhead. NR may support more than one value of subcarrier spacing. Correspondingly, subcarrier spacings of 15 kHz, 30 kHz, and 60 kHz . . . are being considered at the moment. The symbol duration Tu and the subcarrier spacing Δf are directly related through the formula Δf=1/Tu. In a similar manner as in LTE systems, the term "resource element" can be used to denote a minimum resource unit being composed of one subcarrier for the length of one OFDM/SC-FDMA symbol.

In the new radio system 5G-NR for each numerology and each carrier, resource grids of subcarriers and OFDM symbols are defined respectively for uplink and downlink. Each element in the resource grids is called a resource element and is identified based on the frequency index in the frequency domain and the symbol position in the time domain (see 3GPP TS 38.211 v 15.6.0).

<Functional Split Between NG-RAN and 5GC in 5G NR>

Figure 2:
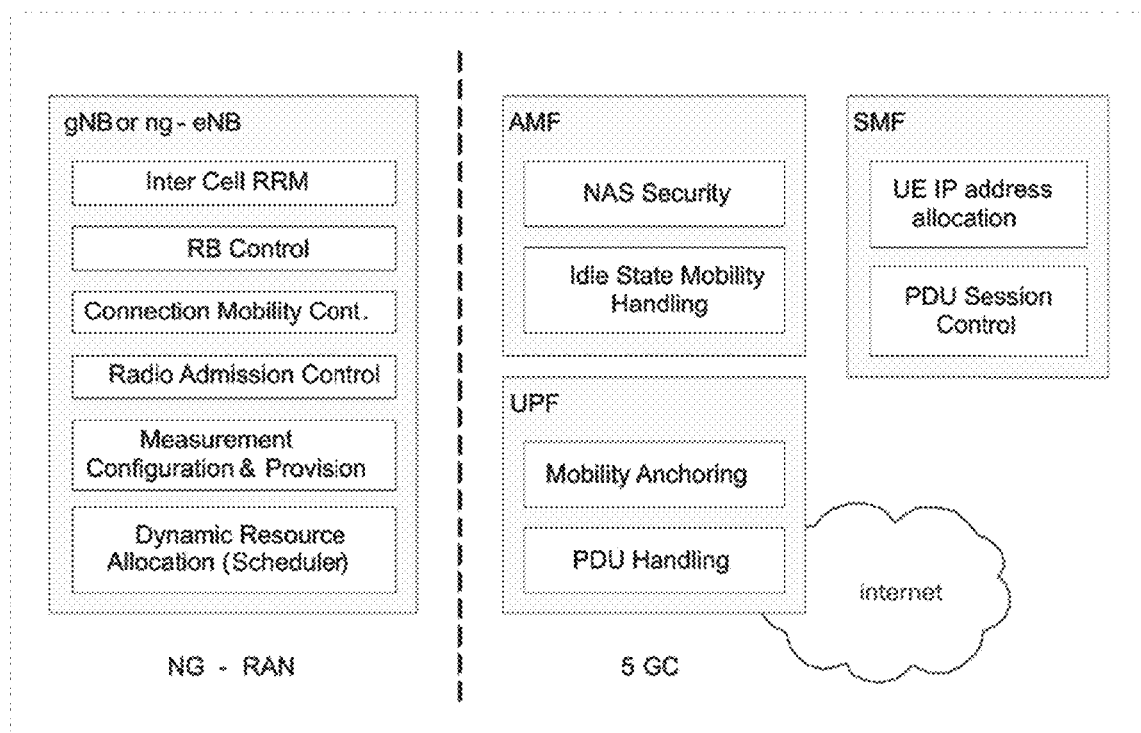
FIG. 2 schematically illustrates a functional split between Next Generation-Radio Access Network (NG-RAN) and 5th Generation Core (5GC)

FIG. 2 illustrates the functional split between the NG-RAN and the 5GC. A logical node of the NG-RAN is gNB or ng-eNB. The 5GC includes logical nodes AMF, UPF, and SMF.

For example, gNB and ng-eNB hosts the following main functions:

Radio Resource Management functions such as Radio Bearer Control, Radio Admission Control, Connection Mobility Control, and dynamic allocation (scheduling) of both uplink and downlink resources to a UE;
IP header compression, encryption, and integrity protection of data;
Selection of an AMF during UE attachment in such a case when no routing to an AMF can be determined from the information provided by the UE;
Routing user plane data towards the UPF;
Routing control plane information towards the AMF;
Connection setup and release;
Scheduling and transmission of paging messages;
Scheduling and transmission of system broadcast information (originated from the AMF or an operation management maintenance function (OAM: Operation, Admission, Maintenance));
Measurement and measurement reporting configuration for mobility and scheduling;
Transport level packet marking in the uplink;
Session management;
Support of network slicing;
QoS flow management and mapping to data radio bearers;
Support of UEs in the RRC_INACTIVE state;
Distribution function for NAS messages;
Radio access network sharing;
Dual connectivity; and
Tight interworking between NR and E-UTRA.

The Access and Mobility Management Function (AMF) hosts the following main functions:

Function of Non-Access Stratum (NAS) signaling termination;
NAS signaling security;
Access Stratum (AS) security control;
Inter-Core Network (CN) node signaling for mobility between 3GPP access networks;
Idle mode UE reachability (including control and execution of paging retransmission);
Registration area management;
Support of intra-system and inter-system mobility;
Access authentication;
Access authorization including check of roaming rights;
Mobility management control (subscription and policies);

Support of network slicing; and

Session Management Function (SMF) selection.

In addition, the User Plane Function (UPF) hosts the following main functions:

Anchor Point for intra-/inter-RAT mobility (when applicable);

External Protocol Data Unit (PDU) session point for interconnection to a data network;

Packet routing and forwarding;

Packet inspection and a user plane part of Policy rule enforcement;

Traffic usage reporting;

Uplink classifier to support routing traffic flows to a data network;

Branching point to support multi-homed PDU session;

QoS handling for user plane (e.g., packet filtering, gating, UL/DL rate enforcement);

Uplink traffic verification (SDF to QoS flow mapping); and

Function of downlink packet buffering and downlink data indication triggering.

Finally, the Session Management Function (SMF) hosts the following main functions.

Session management;

UE IP address allocation and management;

Selection and control of UPF;

Configuration function for traffic steering at the User Plane Function (UPF) to route traffic to a proper destination;

Control part of policy enforcement and QoS; and

Downlink data indication.

<RRC Connection Setup and Reconfiguration Procedure>

Figure 3:
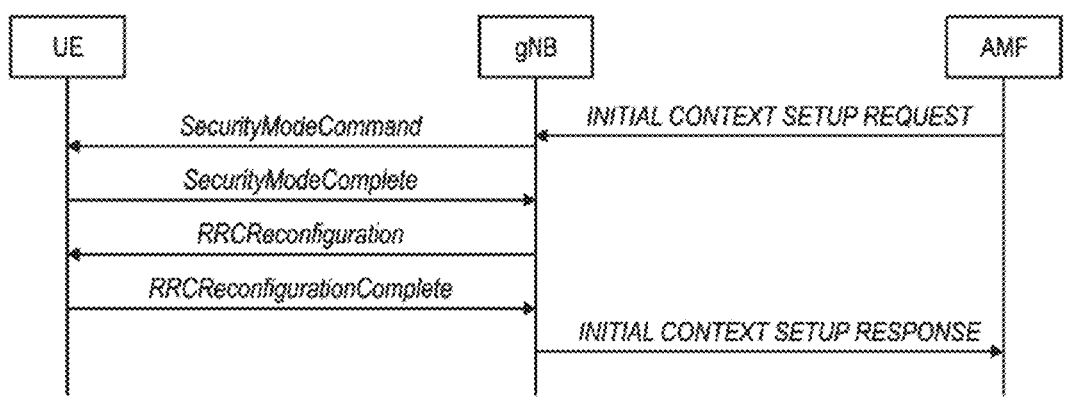
FIG. 3 is a sequence diagram of a Radio Resource Control (RRC) connection setup/reconfiguration procedure.

FIG. 3 illustrates some interactions between a UE, gNB, and AMF (a 5GC Entity) performed in the context of a transition of the UE from RRC_IDLE to RRC_CONNECTED for the NAS part (see TS 38 300 v 15.6.0).

The RRC is higher layer signaling (protocol) used to configure the UE and gNB. With this transition, the AMF prepares UE context data (which includes, for example, a PDU session context, security key, UE Radio Capability, UE Security Capabilities, and the like) and sends it to the gNB with an INITIAL CONTEXT SETUP REQUEST. Then, the gNB activates the AS security with the UE. This activation is performed by the gNB transmitting to the UE a SecuntyModeCommand message and by the UE responding to the gNB with the SecurityModeComplete message. Afterwards, the gNB performs the reconfiguration to setup the Signaling Radio Bearer 2 (SRB2) and Data Radio Bearer(s) (DRB(s)) by means of transmitting to the UE the RRCReconfiguration message and, in response, receiving by the gNB the RRCReconfigurationComplete from the UE. For a signaling-only connection, the steps relating to the RRCReconfiguration are skipped since SRB2 and DRBs are not set up. Finally, the gNB indicates the AMF that the setup procedure is completed with INITIAL CONTEXT SETUP RESPONSE.

Thus, the present disclosure provides a 5th Generation Core (5GC) entity (e.g., AMF, SMF, or the like) including control circuitry, which, in operation, establishes a Next Generation (NG) connection with a gNodeB, and a transmitter, which in operation, transmits an initial context setup message to the gNodeB via the NG connection such that a signaling radio bearer between the gNodeB and a User Equipment (UE) is set up. Specifically, the gNodeB transmits Radio Resource Control (RRC) signaling including a resource allocation configuration Information Element (IE) to the UE via the signaling radio bearer. Then, the UE performs an uplink transmission or a downlink reception based on the resource allocation configuration.

<Usage Scenarios of IMT for 2020 and Beyond>

Figure 4:
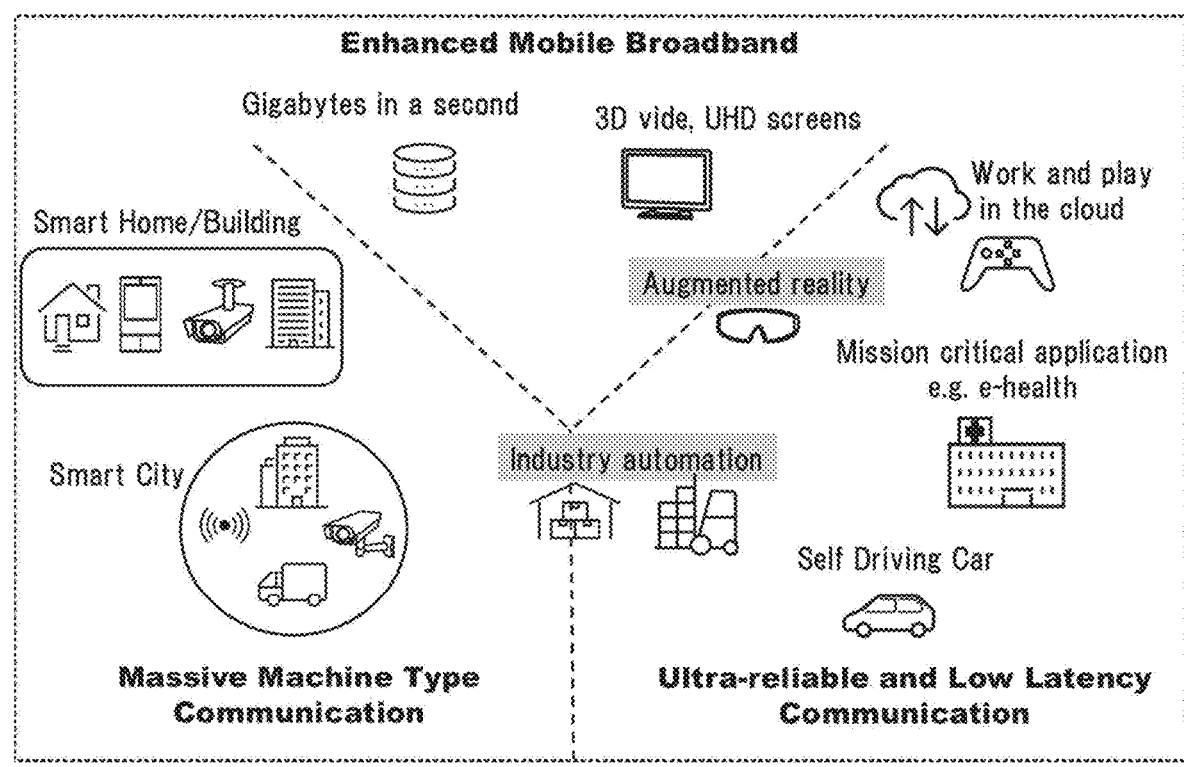
FIG. 4 schematically illustrates usage scenarios of enhanced Mobile BroadBand (eMBB), massive Machine Type Communications (mMTC), and Ultra Reliable and Low Latency Communications (URLLC)

FIG. 4 illustrates some of the use cases for 5G NR. In 3rd generation partnership project new radio (3GPP NR), three use cases are being considered that have been envisaged to support a wide variety of services and applications by IMT-2020. The specification for the phase 1 of enhanced mobile-broadband (eMBB) has been concluded. In addition to further extending the eMBB support, the current and future work would involve the standardization for ultra-reliable and low-latency communications (URLLC) and massive machine-type communications (mMTC). FIG. 4 illustrates some examples of envisioned usage scenarios for IMT for 2020 and beyond (see e.g., ITU-R M.2083 FIG. 2).

The URLLC use case has stringent requirements for capabilities such as throughput, latency and availability. The URLLC use case has been envisioned as one of the enablers for future vertical applications such as wireless control of industrial manufacturing or production processes, remote medical surgery, distribution automation in a smart grid, transportation safety. Ultra-reliability for URLLC is to be supported by identifying the techniques to meet the requirements set by TR 38.913. For NR URLLC in Release 15, key requirements include a target user plane latency of 0.5 ms for UL (uplink) and 0.5 ms for DL (downlink). The general URLLC requirement for one transmission of a packet is a block error rate (BLER) of 1E-5 for a packet size of 32 bytes with a user plane latency of 1 ms.

From the physical layer perspective, reliability can be improved in a number of possible ways. The current scope for improving the reliability involves defining separate CQI tables for URLLC, more compact DCI formats, repetition of PDCCH, or the like. However, the scope may widen for achieving ultra-reliability as the NR becomes more stable and developed (for NR URLLC key requirements). Particular use cases of NR URLLC in Rel. 15 include Augmented Reality/Virtual Reality (AR/VR), e-health, e-safety, and mission-critical applications.

Moreover, technology enhancements targeted by NR URLLC aim at latency improvement and reliability improvement. Technology enhancements for latency improvement include configurable numerology, non slot-based scheduling with flexible mapping, grant free (configured grant) uplink, slot-level repetition for data channels, and downlink pre-emption. Pre-emption means that a transmission for which resources have already been allocated is stopped, and the already allocated resources are used for another transmission that has been requested later, but has lower latency/higher priority requirements. Accordingly, the already granted transmission is pre-empted by a later transmission. Pre-emption is applicable independent of the particular service type. For example, a transmission for a service-type A (URLLC) may be pre-empted by a transmission for a service type B (such as eMBB). Technology enhancements with respect to reliability improvement include dedicated CQI/MCS tables for the target BLER of 1E-5.

The use case of mMTC (massive machine type communication) is characterized by a very large number of connected devices typically transmitting a relatively low volume of non-delay sensitive data. Devices are required to be low cost and to have a very long battery life. From NR perspective, utilizing very narrow bandwidth parts is one possible solution to have power saving from UE perspective and enable long battery life.

As mentioned above, it is expected that the scope of reliability in NR becomes wider. One key requirement to all the cases, for example, for URLLC and mMTC, is high reliability or ultra-reliability. Several mechanisms can improve the reliability from radio perspective and network perspective. In general, there are a few key potential areas that can help improve the reliability. Among these areas are compact control channel information, data/control channel repetition, and diversity with respect to frequency, time and/or the spatial domain. These areas are applicable to reliability improvement in general, regardless of particular communication scenarios.

For NR URLLC, further use cases with tighter requirements have been envisioned such as factory automation, transport industry and electrical power distribution. The tighter requirements are higher reliability (up to 10-6 level), higher availability, packet sizes of up to 256 bytes, time synchronization up to the extent of a few μs (where the value can be one or a few μs depending on frequency range and short latency on the order of 0.5 to 1 ms (in particular a target user plane latency of 0.5 ms), depending on the use cases).

Moreover, for NR URLLC, several technology enhancements from physical layer perspective have been identified. Among these are PDCCH (Physical Downlink Control Channel) enhancements related to compact DCI, PDCCH repetition, increased PDCCH monitoring. Moreover, UCI (Uplink Control Information) enhancements are related to enhanced HARQ (Hybrid Automatic Repeat Request) and CSI feedback enhancements. Also PUSCH enhancements related to mini-slot level hopping and retransmission/repetition enhancements are possible. The term "mini-slot" refers to a Transmission Time Interval (TTI) including a smaller number of symbols than a slot (a slot comprising fourteen symbols).

<QoS Control>

The 5G QoS (Quality of Service) model is based on QoS flows and supports both QoS flows that require guaranteed flow bit rate (GBR QoS flows) and QoS flows that do not require guaranteed flow bit rate (non-GBR QoS Flows). At NAS level, the QoS flow is thus the finest granularity of QoS differentiation in a PDU session. A QoS flow is identified within a PDU session by a QoS flow ID (QFI) carried in an encapsulation header over NG-U interface.

For each UE, 5GC establishes one or more PDU sessions. For each UE, the NG-RAN establishes at least one Data Radio Bearer (DRB) together with the PDU session, e.g., as illustrated above with reference to FIG. 3. Further, additional DRB(s) for QoS flow(s) of that PDU session can be subsequently configured (it is up to NG-RAN when to do so). The NG-RAN maps packets belonging to different PDU sessions to different DRBs. NAS level packet filters in the UE and in the 5GC associate UL and DL packets with QoS Flows, whereas AS-level mapping rules in the UE and in the NG-RAN associate UL and DL QoS Flows with DRBs.

Figure 5:
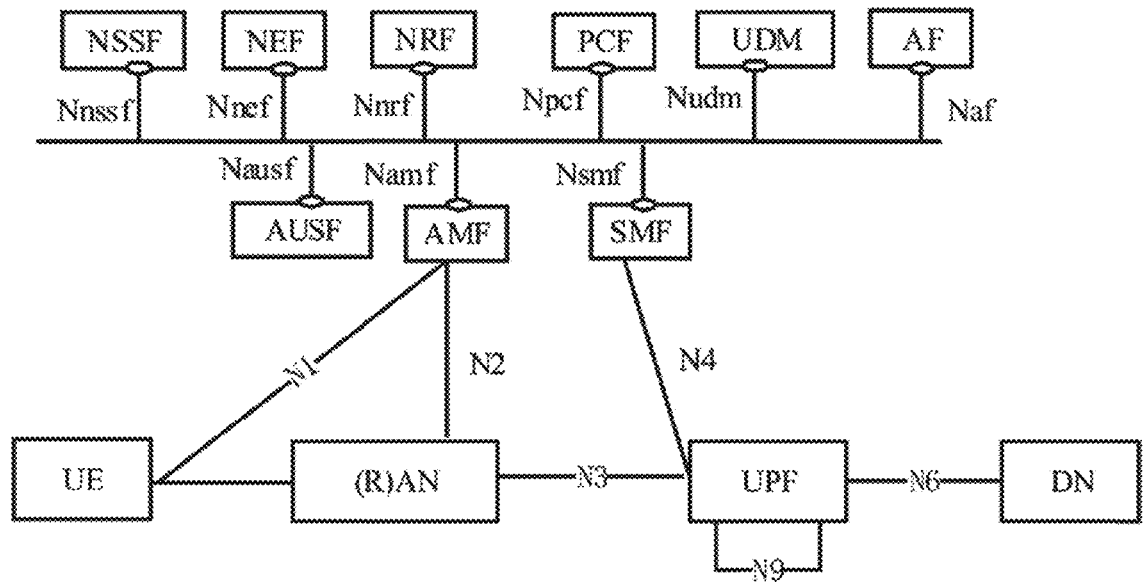
FIG. 5 is a block diagram illustrating an exemplary 5G system architecture for a non-roaming scenario.

FIG. 5 illustrates a 5G NR non-roaming reference architecture (see TS 23.501 v16.1.0, section 4.23). An Application Function (AF) (e.g., an external application server hosting 5G services, exemplarily described in FIG. 4) interacts with the 3GPP Core Network in order to provide services, for example to support application influencing on traffic routing, accessing Network Exposure Function (NEF) or interacting with the policy framework for policy control (e.g., QoS control) (see Policy Control Function, PCF). Based on operator deployment, Application Functions considered to be trusted by the operator can be allowed to interact directly with relevant Network Functions. Application Functions not allowed by the operator to access directly the Network Functions use the external exposure framework via the NEF to interact with relevant Network Functions.

FIG. 5 illustrates further functional units of the 5G architecture, namely Network Slice Selection Function (NSSF), Network Repository Function (NRF), Unified Data Management (UDM), Authentication Server Function (AUSF), Access and Mobility Management Function (AMF), Session Management Function (SMF), and Data Network (DN, e.g., operator services, Internet access, or third party services). All of or a part of the core network functions and the application services may be deployed and running on cloud computing environments.

In the present disclosure, thus, an application server (e.g., AF of the 5G architecture), is provided that includes: a transmitter, which in operation, transmits a request containing a QoS requirement for at least one of URLLC, eMMB and mMTC services to at least one of functions (such as NEF, AMF, SMF, PCF, and UPF) of the 5GC to establish a PDU session including a radio bearer between a gNodeB and a UE in accordance with the QoS requirement; and control circuitry, which in operation, performs the services using the established PDU session.

[Extension to Non-Terrestrial Network (NTN)]

Rel. 15 is the specification of a radio access technology for a terrestrial network, for example. In NR, extension to Non-Terrestrial Networks (NTNs) such as communications using a satellite or a high-altitude pseudolite (High-altitude platform station (HAPS)) is discussed (e.g., see Non-Patent Literature (hereinafter referred to as "NPL") 1).

In an NTN environment, a coverage area of a satellite (e.g., one or more cells) for a terrestrial terminal or a terminal on an aircraft is formed by beams from the satellite, for example. Additionally, transmission of a plurality of beams having sharp directivity from a satellite antenna forms a plurality of cells with divided cover areas. For example, while moving, a terminal performs communication by switching cells by a handover like terrestrial cellular communication.

A single cell may be formed by bundling a plurality of beams from the satellite. In this case, in the NTN environment, for example, switching beams based on the beam management mechanism in NR has been discussed (e.g., see NPL 2).

Figure 6:
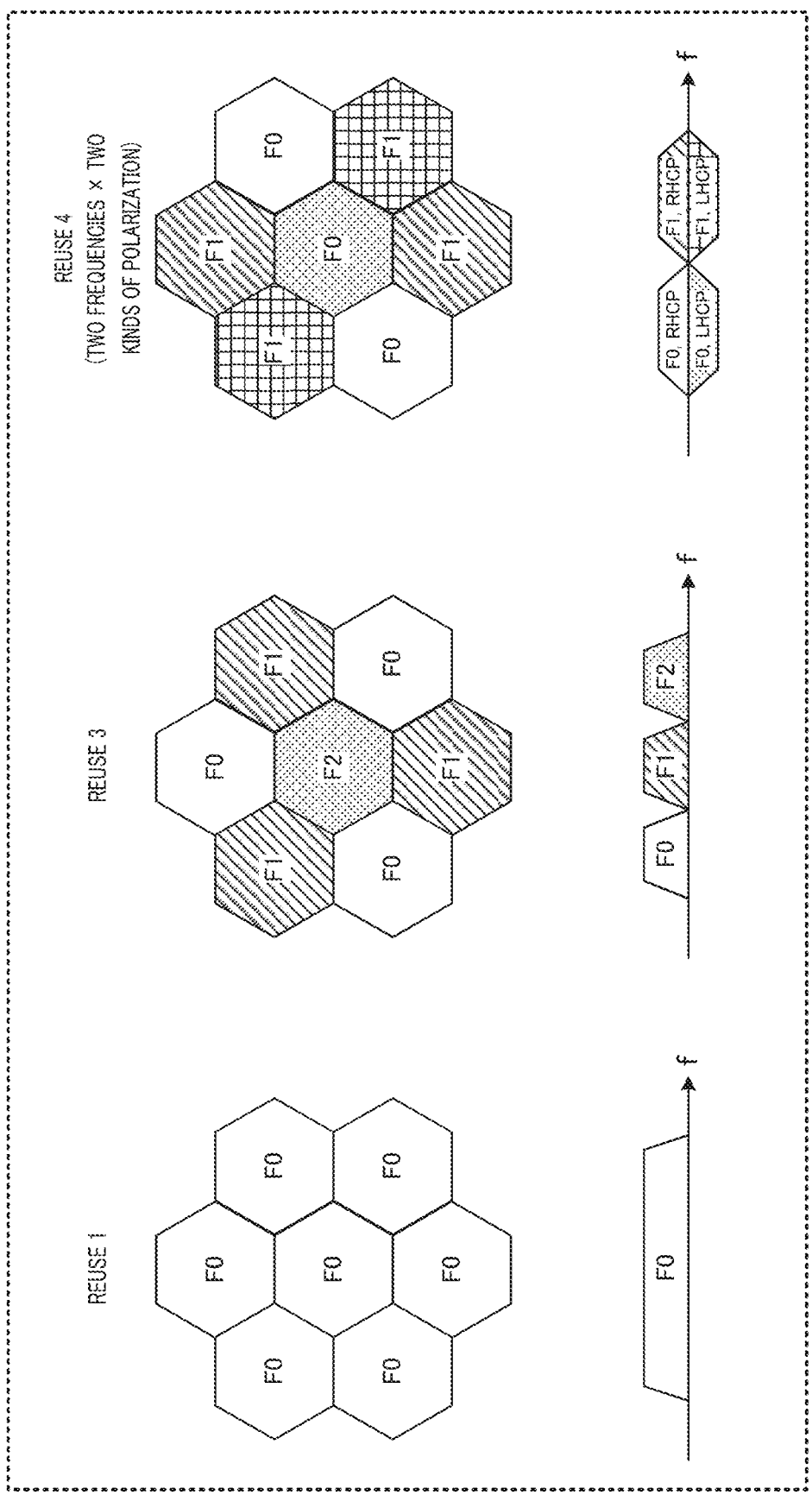
FIG. 6 illustrates exemplary reusing methods for resources.

In addition, "frequency reuse" can be achieved by, for example, using frequencies (or channels) different in adjacent (or neighboring) beams or cells. In the frequency reuse, for example, since different frequencies are used in adjacent beams or cells, inter-beam interference (i.e., inter-cell interference) can be reduced. For example, as illustrated in FIG. 6, frequency reuse 3 (or reuse 3) can be achieved in the case of using three frequencies (e.g., F1, F2, and F3).

Further, in satellite communication, for example, circular polarization (polarized wave) is applied. For example, inter-beam interference can be reduced by using, in addition to the frequency reuse, different kinds of polarization in adjacent beams. In one example, as illustrated in FIG. 6, reuse 4 can be achieved in the case of using two frequencies (e.g., F1 and F2) and two kinds of polarization (e.g., Right Handed Circular Polarization (RHCP) and Left Handed Circular Polarization (LHCP).

A method for reusing polarization (e.g., how polarization is used or which polarization is used) depends on, for example, a network operation. Here, for example, on a reception side (e.g., terminal or base station), even a linear polarization antenna can receive a signal by separating polarization as long as the polarization to be used is known. In contrast, on the reception side (e.g., terminal or base station), when the polarization to be used is unknown, it is possible to receive signals of both kinds of polarization (e.g., RHCP and LHCP) by, for example, receiving the signals by means of diversity combining, which may result in generation of loss, however.

Thus, for example, when a terminal can determine polarization to be used in a downlink signal, it is possible to perform reception processing based on a reception method according to the polarization, and thereby reception performance can be improved.

Further, for example, since the RHCP and LHCP are orthogonal, it is possible to improve the throughput by multiplexing signals by means of different circular polarization (e.g., also referred to as polarization multiplex transmission). In other words, the circular polarization can be used for the polarization multiplex transmission as well as the resource reuse.

However, in 5G NR (e.g., Rel. 15), a method for determining polarization to be used in a terminal (e.g., indication method) or a method for using circular polarization has not fully studied.

Therefore, in the present disclosure, a method for determining and using polarization in a terminal will be described.

Embodiment 1

[Overview of Radio Communication System]

A radio communication system according to an embodiment of the present disclosure includes base station 100 and terminal 200. The radio communication system may be, for example, an NTN environment satellite communication system or other radio communication systems. Base station 100 and terminal 200 are both exemplary radio communication devices.

Figure 7:
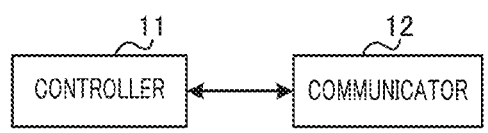
FIG. 7 is a block diagram illustrating a configuration of a part of a base station according to Embodiment 1.

FIG. 7 is a block diagram illustrating a configuration example of a part of base station 100 according to each embodiment of the present disclosure. In base station 100 illustrated in FIG. 7, controller 11 (e.g., corresponding to control circuitry) determines polarization of a radio signal for terminal 200 in at least one of the first phase in radio communication and the second phase which is in and/or after the first phase. Communicator 12 (e.g., corresponding to communication circuitry) performs at least one of transmission and reception of the radio signal based on the determined polarization. In the following, the term "phase" may be replaced with other terms such as "radio communication," "period" or "time interval" in radio communication. The "period" or "time interval" in radio communication may be regarded as an exemplary "time resource." "Polarization" is also an exemplary resource in radio communication as well as the frequency resource and time resource.

Figure 8:
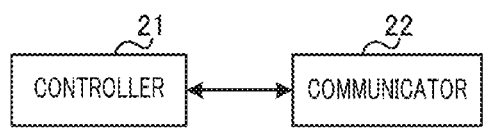
FIG. 8 is a block diagram illustrating a configuration of a part of a terminal according to Embodiment 1.

FIG. 8 is a block diagram illustrating a configuration example of a part of terminal 200 according to each embodiment of the present disclosure. In terminal 200 illustrated in FIG. 8, controller 21 (e.g., corresponding to control circuitry) determines polarization of a radio signal in at least one of the first phase in radio communication and the second phase which is in and/or after the first phase. Communicator 22 performs at least one of transmission and reception of the radio signal based on the determined polarization.

[Configuration of Base Station]

Figure 9:
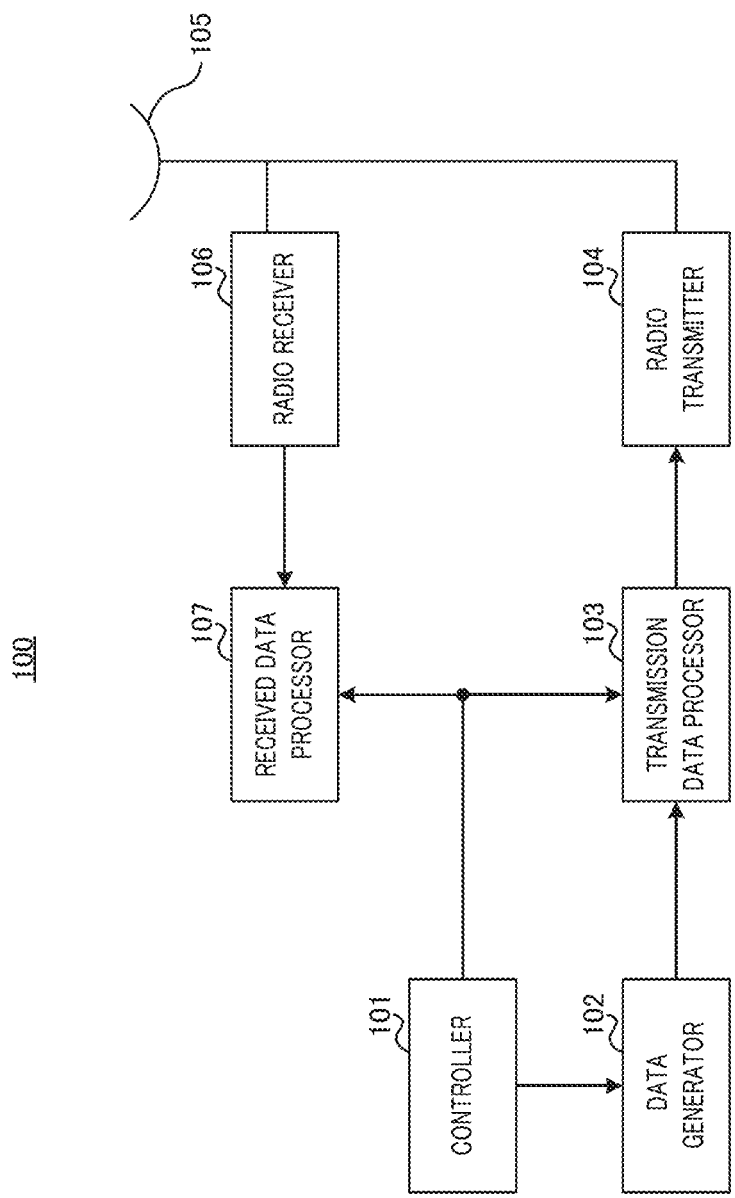
FIG. 9 is a block diagram illustrating a configuration example of the base station according to Embodiment 1.

FIG. 9 is a block diagram illustrating a configuration example of base station 100. Base station 100 illustrated in FIG. 9 includes, for example, controller 101, data generator 102, transmission data processor 103, radio transmitter 104, antenna 105, radio receiver 106, and received data processor 107. Incidentally, for example, controller 101, data generator 102, transmission data processor 103, and received data processor 107 that are illustrated in FIG. 9 may correspond to controller 11 illustrated in FIG. 7, whereas antenna 105, radio transmitter 104, and radio receiver 106 that are illustrated in FIG. 9 may correspond to communicator 12 illustrated in FIG. 7.

Controller 101 controls, for example, a setting of polarization in at least one of transmission (i.e., downlink) and reception (i.e., uplink). For example, controller 101 may configure polarization per cell, beam, or terminal 200 (i.e., user). Further, for example, controller 101 may configure polarization for each of the downlink and the uplink, or may configure polarization common in the downlink and the uplink. Controller 101, for example, outputs information relating to the polarization (hereinafter, referred to as polarization information) to be used for reception to received data processor 107, outputs polarization information to be used for transmission to transmission data processor 103, and outputs, to data generator 102, polarization information to be indicated to terminal 200.

Data generator 102 generates, for example, a downlink data signal such as user data, system information, or individual control information (e.g., RRC signaling or downlink control information (DCI)) for each terminal 200, and outputs the generated downlink data signal to transmission data processor 103. For example, data generator 102 may generate a downlink data signal based on the polarization information input from controller 101 and may generate a downlink data signal including the polarization information.

Transmission data processor 103 encodes and modulates the downlink data signal input from data generator 102. In addition, transmission data processor 103 performs transmission polarization processing (e.g., RHCP, LHCP, or both) based on, for example, the polarization information input from controller 101. Transmission data processor 103 outputs the signal resulting from the transmission processing to radio transmitter 104.

Radio transmitter 104 performs radio transmission processing such as D/A conversion, up-conversion, amplification, or the like on the signal input from transmission data processor 103, and transmits, from antenna 105, the radio signal resulting from the radio transmission processing.

Radio receiver 106 performs radio reception processing such as down-conversion, A/D conversion, or the like on a data signal received from terminal 200 via antenna 105, and outputs the received signal resulting from the radio reception processing to received data processor 107.

Received data processor 107 performs reception polarization processing on the received signal based on, for example, the polarization information input from controller 101. Received data processor 107 also demodulates and decodes the received signal to output received data. Incidentally, the reception polarization processing may include processing for separating the polarization (de-polarization) by, for example, multiplying polarization vectors of the RHCP and LHCP.

[Configuration of Terminal]

Figure 10:
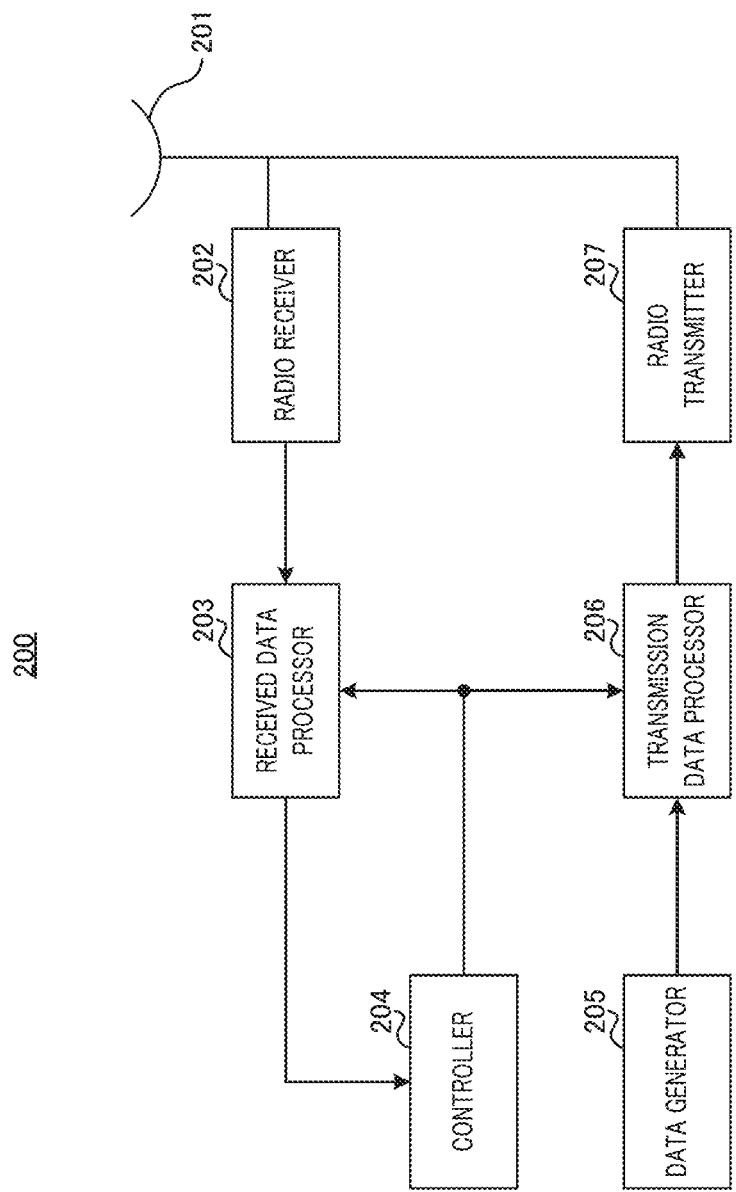
FIG. 10 is a block diagram illustrating a configuration example of the terminal according to Embodiment 1.

FIG. 10 is a block diagram illustrating a configuration example of terminal 200. Terminal 200 illustrated in FIG. 10 includes, for example, antenna 201, radio receiver 202, received data processor 203, controller 204, data generator 205, transmission data processor 206, and radio transmitter 207. Incidentally, for example, controller 204, data generator 205, transmission data processor 206, and received data processor 203 that are illustrated in FIG. 10 may correspond to controller 21 illustrated in FIG. 8, whereas antenna 201, radio transmitter 207, and radio receiver 202 that are illustrated in FIG. 10 may correspond to communicator 22 illustrated in FIG. 8.

Radio receiver 202 performs radio reception processing such as down-conversion, A/D conversion, or the like on a data signal received from base station 100 via antenna 201, and outputs the received signal resulting from the radio reception processing to received data processor 203.

Received data processor 203 performs reception polarization processing (de-polarization) on the received signal based on, for example, the polarization information input from controller 204. Received data processor 203 also demodulates and decodes the received signal and outputs, to controller 204, the polarization information included in a received data.

Controller 204 determines polarization to be set in at least one of reception (i.e., downlink) and transmission (i.e., uplink) based on, for example, the polarization information input from received data processor 203 or the information specified in a standard (or specification). Meanwhile, controller 204 may determine, for example, use of polarization that has been previously defined (i.e., set) in a period prior to receiving an indication of the polarization information from base station 100, such as at the time of initial access (or also referred to as initial connection). Controller 204, for example, outputs polarization information to be used for reception to received data processor 203 and outputs polarization information to be used for transmission to transmission data processor 206.

Data generator 205, for example, generates an uplink data signal including user data or feedback information and outputs the generated downlink data signal to transmission data processor 206.

Transmission data processor 206 encodes and modulates the downlink data signal input from data generator 205. In addition, transmission data processor 206 performs transmission polarization processing (e.g., right-handed, left-handed, or both) based on, for example, the polarization information input from controller 204. Transmission data processor 206 outputs the signal resulting from the transmission processing to radio transmitter 207.

Radio transmitter 207 performs radio transmission processing such as D/A conversion, up-conversion, amplification, or the like on the signal input from transmission data processor 206, and transmits, from antenna 201, the radio signal resulting from the radio transmission processing.

[Operational Examples of Base Station 100 and Terminal 200]

Operational examples of above-mentioned base station 100 and terminal 200 will be described.

In the present embodiment, the previously-defined polarization is set for a channel and signal to be communicated at least in the initial access.

On the other hand, for a channel and signal to be communicated in a process different from the initial access, for example, a channel and signal assigned per user, polarization indicated from base station 100 to terminal 200 is set, for example. Incidentally, when no indication is made from base station 100 to terminal 200, terminal 200 may configure, for example, the previously-defined polarization.

Figure 11:
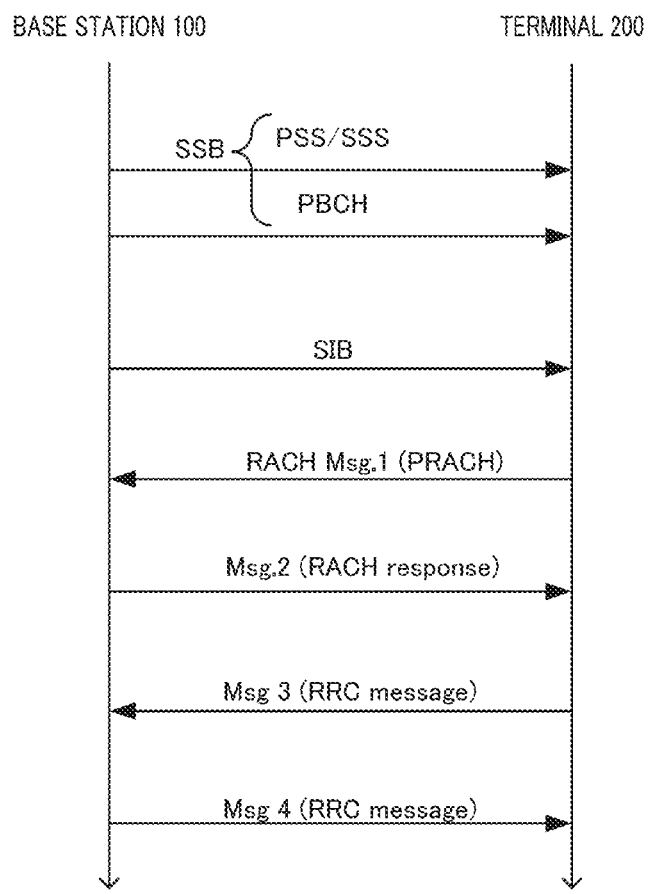
FIG. 11 illustrates an exemplary initial access.

FIG. 11 is a sequence diagram illustrating an exemplary initial access.

For example, base station 100 transmits a Synchronization Signal Block (SSB) to terminal 200, and terminal 200 acquires, from the received SSB, synchronization with base station 100 and a common cell parameter. The SSB may include, for example, a synchronization signal such as a Primary Synchronization Signal (PSS) and a Secondary Synchronization Signal (SSS), and a broadcast channel (Physical Broadcast Channel (PBCH)).

Next, terminal 200 receives system information broadcasted by a System Information Block (SIB) transmitted from base station 100.

Terminal 200, for example, in the initial access (i.e., random access procedure), transmits a preamble signal (e.g., Physical Random Access Channel (PRACH) or also referred to as Msg. 1) to base station 100 based on a resource specified in the system information.

Base station 100 receives the PRACH and transmits, to terminal 200, a response signal to the PRACH (e.g., RACH response or also referred to as Msg. 2). The RACH response may be transmitted in, for example, a downlink data channel (e.g., Physical Downlink Shared Channel (PDSCH)).

Next, terminal 200 transmits an RRC message including a connection request to base station 100 (or referred to as Msg. 3) based on the RACH response.

Base station 100 transmits, to terminal 200, an RRC message including a response signal to Msg. 3 (or referred to as Msg. 4).

As mentioned above, in the present embodiment, fixed polarization is set for at least the SSB and SIB in the initial access. Terminal 200 determines, for example, the fixed polarization to the polarization of the SSB and SIB.

Incidentally, the fixed polarization may be previously defined in the standard (or specification) or may be configured for each system, for example. The fixed polarization may be, for example, either one or both the RHCP and the LHCP.

On the other hand, in the present embodiment, the polarization for another channel and signal different from the SSB and SIB may be determined (i.e., set or indicated) based on, for example, information from base station 100 to terminal 200.

Hereinafter, as an example, Methods 1 to 3 for determining polarization will be described, respectively.

<Method 1>

In Method 1, polarization is controlled per cell or beam. Additionally, in Method 1, polarization information to be set for each cell or each beam is indicated to terminal 200 by the SIB.

For example, in FIG. 11, terminal 200 acquires the polarization information from the SIB and determines the polarization indicated in the acquired polarization information as polarization used in communication (e.g., at least one of transmission and reception) after PRACH transmission. Incidentally, polarization different in the transmission (i.e., uplink) and reception (i.e., downlink) may be set for terminal 200.

Figure 12:
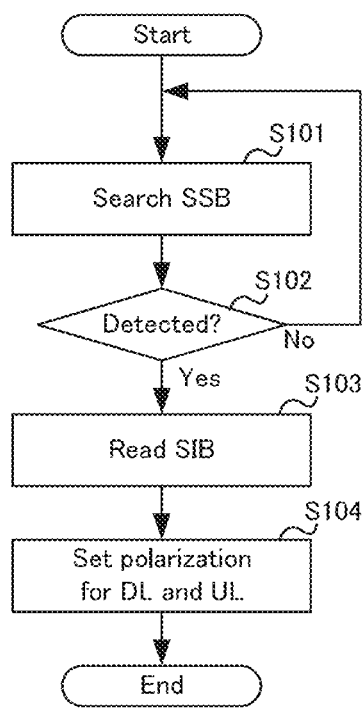
FIG. 12 is a flowchart illustrating an operation example of a terminal according to Method 1 in Embodiment 1.

FIG. 12 is a flowchart illustrating exemplary processing of terminal 200 according to Method 1.

In FIG. 12, terminal 200, for example, searches for (in other words, detects) the SSB at the time of initial access (S101). For example, in a case where polarization used for the SSB is known, terminal 200 (e.g., received data processor 203) searches for the SSB based on the polarization (e.g., fixed polarization). On the other hand, in a case where polarization is unknown, terminal 200 may switch no-polarization, the RHCP, and the LHCP to search for (i.e., blind determine) the SSB, or may search for the SSB by polarization diversity reception, for example.

In a case where the SSB is not detected (S102: No), terminal 200 returns to the processing in S101 and repeats searching for the SSB. On the other hand, in a case where the SSB is detected (S102: Yes), terminal 200 receives the SIB (S103). For example, terminal 200 (e.g., received data processor 203) may receive the SIB based on the fixed polarization. Terminal 200 acquires, for example, a cell operation parameter and the polarization information from the received SIB.

Terminal 200 sets the acquired polarization as, for example, polarization to be used for reception processing (i.e., processing in downlink) and transmission processing (i.e., processing in uplink) (S104). For example, after acquiring the polarization information, terminal 200 configures the polarization for received data processor 203 and transmission data processor 206.

Incidentally, when the polarization information is not included in the SIB, terminal 200 may perform communication after the reception of the SIB based on the fixed polarization.

Meanwhile, base station 100 may also indicate polarization per terminal group by the SIB. The terminal group is formed by, for example, a type or terminal ID of each terminal 200 (e.g., cell-radio network temporary identifier (C-RNTI) or the like). Using polarization different per terminal group enables multiplex transmission by the polarization.

Moreover, base station 100 may include, in the SIB to be broadcasted in the cell, information on an association between the SSB number and the polarization, e.g., information regarding which polarization is used in which beam. This allows terminal 200 to know the polarization used in the beam in the cell, and thus the appropriate polarization can be used in Measurement of an adjacent beam (e.g., measurement of L1-RSRP or the like), as a result, it is possible to perform the Measurement quickly.

Furthermore, base station 100 may indicate by the SIB, in addition to the polarization information of a certain cell or beam, polarization information of neighboring cells or beams of the cell. Accordingly, for example, terminal 200 can know the polarization used in the neighboring cells or beams, so that the Measurement for handover or beam switching can be performed quickly. Alternatively, the information on the polarization to be used in the next cell or beam may be included in a handover message at the time of handover or beam switching. This allows terminal 200 to acquire information on the polarization to be used next in advance, and thus, quick handover and beam switching can be achieved.

Thus, for example, terminal 200 determines the fixed polarization as polarization to be used in radio communication until the reception of the SIB, and determines the polarization indicated by the SIB indicated from base station 100, as polarization to be used in radio communication after the reception of the SIB.

The polarization indicated by the SIB allows base station 100 to flexibly set polarization per cell or beam, so that inter-cell interference (or referred to as inter-beam interference) can be suppressed, for example. In addition, throughput can be improved by polarization multiplexing based on this polarization.

Moreover, in Method 1, base station 100 can indicate at a time by the SIB, the polarization information to a plurality of terminals 200 in units of cells or beams, and thus, the amount of resources required for the indication of polarization can be reduced.

Further, in Method 1, the indication of polarization by the SIB makes it possible to indicate the polarization to terminal 200 in an RRC_IDLE state or RRC_INACTIVE state; thus, the polarization per cell or beam can be set even for data (e.g., Paging data or RACH response) received by terminal 200 in the RRC_IDLE state or RRC_INACTIVE state.

Incidentally, the information on the polarization with respect to the PRACH, which is the first channel to be transmitted at the time of initial access of the terminal, may be indicated in, for example, IE RACH-ConfigCommon, IE RACH-ConfigDedicated, and IE RACH-ConfigCommon-Generic that are RRC parameters, or in prach-ConfigurationIndex that is a parameter to define a format of the PRACH. In this case, terminal 200 can acquire the polarization information at the same time with the PRACH format or a transmission resource. Alternatively, it is also possible to indicate polarization different for each type of RACH procedures such as a competition-based RACH or a non-competitive RACH (Contention Free Random Access: CFRA).

Incidentally, when a system band is divided into a plurality of frequencies by using a Component Carrier (CC) or a Bandwidth Part (BWP), base station 100 may indicate, to terminal 200, polarization information per CC or BWP. In this case, terminal 200 may receive the SSB or SIB based on the fixed polarization in the frequency band including the CC or BWP, whereas, in the CC or BWP assigned for communication of the user data, may receive or transmit the user data based on the polarization indicated by the SIB. Note that, the CC is sometimes referred to as a Cell, a primary Cell (PCell), or a secondary Cell (SCell), a Primary SCell (PSCell), a Master Cell Group (MCG), a Secondary Cell Group (SCG), and the like. Further, in a case where a CC or BWP is set for each terminal, base station 100 may indicate, to terminal 200, dedicated RRC control information (dedicated RRC signaling) including the polarization information every time the CC or BWP is set or changed.

Further, base station 100 may determine in advance, for each area on the ground (e.g., area defined by longitude and latitude coordinates), polarization of a beam covering the area and indicate, to terminal 200, a plurality of kinds of beam information including the position information and the polarization information. In this case, since a terminal capable of acquiring the position information by GNSS or the like can know the polarization by its own position, it is not necessary to indicate the polarization at every time of beam switching, and thereby control information amount can be reduced.

<Method 2>

In Method 2, the polarization is controlled for each terminal 200.

For example, base station 100 may indicate, to each terminal 200, polarization information for each terminal 200 by higher layer signaling dedicated to terminal 200 (e.g., Dedicated RRC signaling).

In the initial access, the dedicated RRC signaling is transmitted in, for example, Msg. 4 illustrated in FIG. 11. Terminal 200, for example, in FIG. 11, acquires the polarization information from Msg. 4 and determines the polarization indicated in the acquired polarization information as polarization used in communication (e.g., at least one of transmission and reception) after receiving Msg. 4. Incidentally, for terminal 200, polarization different in the transmission and reception may be set. Alternatively, polarization different per physical channel may be set.

Further, terminal 200 in the RRC_IDLE state or RRC_INACTIVE state does not receive the dedicated RRC signaling. Therefore, terminal 200 may use, for example, the fixed polarization (e.g., the same polarization as that of SSB or SIB) for data received in the RRC_IDLE state or RRC_INACTIVE state (e.g., Paging data or RACH response).

Figure 13:
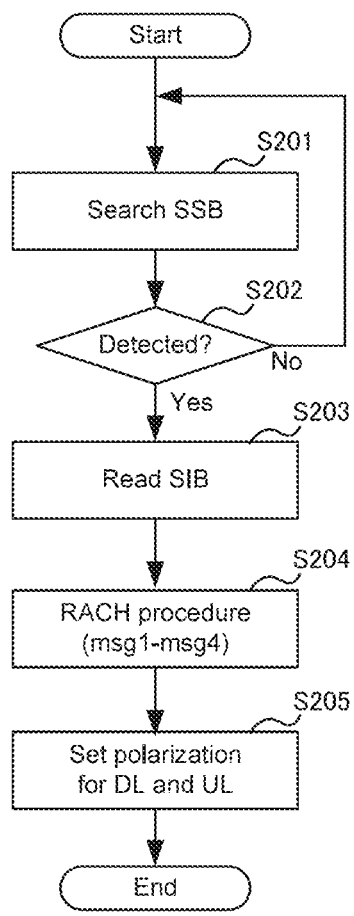
FIG. 13 is a flowchart illustrating an operation example of a terminal according to Method 2 in Embodiment 1.

FIG. 13 is a flowchart illustrating exemplary processing of terminal 200 according to Method 2.

In FIG. 13, terminal 200, for example, searches for (in other words, detects) the SSB at the time of initial access (S201). In a case where the SSB is not detected (S202: No), terminal 200 returns to the processing in S201 and repeats searching for the SSB. On the other hand, in a case where the SSB is detected (S202: Yes), terminal 200 receives the SIB (S203). Further, terminal 200 performs RACH procedures (e.g., transmission and reception of Msg.1 to Msg.4) (S204).

Terminal 200 may perform communication based on the fixed polarization in, for example, the processing from S201 (searching for SSB) to S204 (RACH procedures). In addition, for example, terminal 200 acquires the polarization information from Msg. 4.

Terminal 200 sets the acquired polarization as, for example, polarization used for the reception processing (i.e., processing in downlink) and the transmission processing (i.e., processing in uplink) (S205). For example, after acquiring the polarization information, terminal 200 configures the polarization for received data processor 203 and transmission data processor 206.

Incidentally, when the polarization information is not included in Msg. 4 (e.g., dedicated RRC signaling), terminal 200 may perform communication after the reception of Msg. 4 based on the fixed polarization. Further, for example, when receiving the dedicated RRC signaling including the polarization information in the communication after Msg.4, terminal 200 may use the polarization indicated by the dedicated RRC signaling in communication after the reception of the dedicated RRC signaling.

Thus, in Method 2, for example, terminal 200 determines the fixed polarization (e.g., the same polarization as that of SSB or SIB) as polarization to be used for radio communication until Msg. 4 and determines the polarization indicated by the dedicated RRC signaling received from base station 100 as polarization to be used for radio communication after the reception of Msg. 4.

The polarization indicated by the dedicated RRC signaling allows base station 100 to flexibly set polarization for each terminal 200, so that inter-cell interference (or referred to as inter-beam interference) can be suppressed, for example. In addition, since the polarization can be set for each terminal 200, it is possible to improve the throughput by, for example, polarization multiplex transmission (e.g., also referred to as inter UE multiplexing) among terminals 200.

As an example of the polarization set for each terminal 200, the circular polarization may be set for terminal 200 that uses satellite communication (e.g., very small aperture terminal (VSAT) system) or a Phased Array, and the linear polarization may be set for terminal 200 with lower ability (capability) (e.g., internet of things (IoT) terminal).

Further, base station 100, in the setting of the polarization for each terminal 200 for example, may set the same polarization for a plurality of terminals 200 in the cell or in the beam. This polarization setting makes it possible to set, for example, the polarization per cell or beam, and thus, the inter-cell interference (or inter-beam interference) can be suppressed.

Further, in Method 2, the polarization for each terminal 200 may be indicated by a MAC Control Element (MAC CE) instead of the dedicated RRC signaling.

Further, the description has been given with the case where the polarization for each terminal 200 is indicated in Msg.4, but the present disclosure is not limited to this case, and for example, the polarization for each terminal 200 may be indicated in Msg.2. Additionally, FIG. 11 illustrates the case of a four-step RACH, but the present disclosure is not limited to this case, and for example, the polarization may be indicated in Msg. B when using two-step RACH introduced in Rel. 16. Msg. B is a response to the PUSCH including the PRACH and Msg. A, while being data including the RACH response and the RRC message.

<Method 3>

In Method 3, the polarization is controlled for each kind of data of terminal 200.

For example, base station 100 may indicate, to terminal 200, polarization information for each kind of data of terminal 200 by control information (e.g., downlink control information (DCI)) that indicates an assignment of data to terminal 200. Terminal 200, for example, acquires the polarization information from the DCI and determines the polarization indicated in the acquired polarization information as polarization to be used in communication (e.g., at least one of transmission and reception) after receiving the DCI. Incidentally, polarization for a signal that transmits the DCI (e.g., PDCCH) may be the fixed polarization (e.g., previously determined polarization or polarization set per cell).

Figure 14:
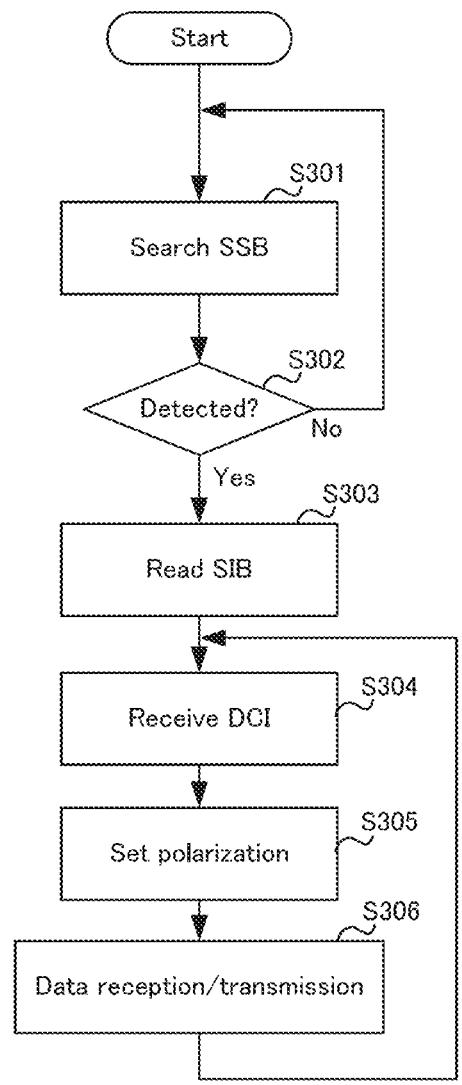
FIG. 14 is a flowchart illustrating an operation example of a terminal according to Method 3 in Embodiment 1.

FIG. 14 is a flowchart illustrating exemplary processing of terminal 200 according to Method 3.

In FIG. 14, terminal 200, for example, searches for (in other words, detects) the SSB at the time of initial access (S301). In a case where the SSB is not detected (S302: No), terminal 200 returns to the processing in S301 and repeats searching for the SSB. On the other hand, in a case where the SSB is detected (S302: Yes), terminal 200 receives the SIB (S303). Further, terminal 200 receives the DCI (S304).

Terminal 200 may perform communication based on the fixed polarization in, for example, the processing from S301 (searching for SSB) to S304 (reception of DCI). In addition, for example, terminal 200 acquires the polarization information included in the DCI.

Terminal 200 sets the acquired polarization as, for example, polarization used for the reception processing (i.e., processing in downlink) and the transmission processing (i.e., processing in uplink) (S305).

Then, terminal 200 performs reception of data or transmission of data based on the set polarization (S306).

Incidentally, when the polarization information is not included in the DCI, terminal 200 may perform data communication after the reception of the DCI based on the fixed polarization.

Here, an example of a method for indicating polarization by the DCI includes a method for indicating by adding a bit indicating the polarization in the DCI (e.g., referred to as polarization-indicating bit), a method for indicating by downlink transmission configuration information (e.g., transmission configuration indication (TCI) state), or a method for indicating by Precoding information (e.g., transmitted precoding matrix indicator (TPMI)). That is, the polarization indicated by the DCI is indicated by, for example, the polarization-indicating bit, the TC state, the Precoding information, or antenna port indication.

Hereinafter, a description will be given of an example of an indication method by the polarization-indicating bit, TCI state, Precoding information, or antenna port indication.

<Indication Method by Polarization-Indicating Bit>

For example, a polarization-indicating bit may be added in a DCI that indicates a data allocation in at least one of downlink and uplink.

For example, the DCI (or DCI format) in the downlink allocation includes DCI format 1_0, 1_1, and the DCI (or DCI format) in the uplink allocation includes DCI format 0_0, 0_1.

For example, each of the DCI formats may include the polarization-indicating bit. Alternatively, some of the DCI formats (e.g., DCI format 1_1 and 0_1 corresponding to two or more layers) may include the polarization-indicating bit. This can reduce an overhead of the control information.

Alternatively, a DCI transmitted by a terminal-dedicated search space may include the polarization-indicating bit, whereas another DCI (e.g., DCI transmitted by a common search space) may not include the polarization-indicating bit. Thus, terminal 200 can acquire the polarization information in the dedicated search space to terminal 200.

Meanwhile, the presence or absence of the polarization-indicating bit in each DCI may be defined, for example, in a standard (or specification), or may be indicated, to terminal 200, by the SIB or terminal-dedicated RRC signaling. For example, when the presence or absence of the polarization-indicating bit is indicated by the SIB, an indication of polarization for transmission or reception of any of Msg. 1 to Msg. 4 in the RACH procedures is possible. On the other hand, for example, when the presence or absence of the polarization-indicating bit is indicated by the terminal-dedicated RRC signaling, an indication of polarization for data transmission and reception after the reception of Msg. 4 in the RACH procedures is possible.

Further, for example, the presence or absence of the polarization-indicating bit may be set for each terminal 200. For example, the presence or absence of the polarization-indicating bit may be switched by the type of terminal 200. In one example, terminal 200 having a fixed and large antenna, such as a parabolic antenna or Phased Array, may be set to have the polarization-indicating bit (i.e., polarization is controllable), and terminal 200 having a portable and small antenna, such as a patching antenna, may be set to have no polarization-indicating bit (i.e., polarization is not controlled).

Thus, the indication of polarization by the polarization-indicating bit makes it possible to, for example, avoid interference due to the polarization in transmission in each terminal 200.

In addition, the indication of the polarization by the polarization-indicating bit enables, for example, setting the polarization for each data transmission of terminal 200, and thus, polarization multiplex transmission among terminals 200 (e.g., inter UE multiplexing), or the polarization multiplex transmission for the same terminal 200 (e.g., intra UE multiplexing) can be more flexibly applied. For example, polarization may be switched for each terminal 200 or for each data transmission of terminal 200, depending on a position or propagation status of terminal 200. The system throughput can be thus improved by, for example, application of the polarization multiplex transmission to terminal 200 positioned near a center of a cell or beam and avoidance of interference, based on polarization different from that in a neighboring cell or beam for terminal 200 positioned at a cell edge or beam edge.

<Indication by TCI State>

In Rel. 15, for example, a TC state indicates identification information (e.g., SSB ID or channel state information reference signal (CSI-RS) ID) of a signal referenced by terminal 200 upon transmitting or receiving data (e.g., reference signal).

Therefore, in the present embodiment, base station 100 indicates the polarization information by including it in the TCI state.

In the TC state, channel characteristics (e.g., doppler shift or latency) that terminal 200 can refer to upon transmitting or receiving data is defined as "QCL." For example, a plurality of QCL types are defined according to the kinds of channel characteristics that can be referenced.

In Method 3, polarization is added to, for example, the referable channel characteristics included in the QCL type. For example, the polarization can be set in the QCL type included in the TCI state to be transmitted from base station 100 to terminal 200. This setting associates, for example, polarization used for the reference signal corresponding to the SSB ID or CSI-RS ID with polarization used for the data.

For example, as illustrated in FIG. 15, "QCL type E" corresponding to the polarization may be defined as one of QCL types. Further, as illustrated in FIG. 16, in an RRC message related to the TCI state and QCL, QCL type E (e.g., type E) may be set as the QCL type (e.g., qcl-Type).

Incidentally, the polarization to be set for the SSB corresponding to each SSB ID may be set by, for example, a method based on the present embodiment or based on Embodiment 2 or 3 to be described later. Further, the polarization to be set for a CSI-RS corresponding to each CSI-RS ID may be indicated explicitly by, for example, an RRC-message of CSI-RS configuration (e.g., CSI-ResourceConfig), or may be indicated implicitly. For example, when the indication is performed implicitly, one of RHCP and LHCP may be indicated by an even-numbered ID among the CSI-RS IDs and the other may be indicated by an odd-numbered ID. The most significant bit or the least significant bit may be used for indication.

Further, base station 100 can indicate, to terminal 200, information on a plurality of QCLs (e.g., set of SSB ID or CSI-RS ID and QCL type) by the TCI state. For example, polarization can be set more flexibly for terminal 200 by following indications:

Indication Method A:

For example, when setting polarization per beam (or per cell) or using any kind of polarization for each terminal, base station 100 may indicate a TCI state in which the SSB ID and the polarization are associated with each other. In other words, base station 100 indicates the TC state information, including therein the polarization information in addition to the SSB ID.

Indication Method B:

For example, when applying the polarization multiplex transmission among terminals 200, base station 100 indicates a TCI state in which one CSI-RS ID and polarization are associated with each other, for example. In other words, base station 100 indicates the TCI state information, including therein the polarization information in addition to the CSI-RS ID. At this time, base station 100, for example, indicates a CSI-RS ID associated with polarization different for each of the plurality of terminals 200 subject to the polarization multiplex transmission.

Indication Method C:

For example, when applying the polarization multiplex transmission in the same terminal 200, base station 100 indicates a TCI state in which each of two CSI-RS IDs and the polarization are associated with each other, for example. In other words, base station 100 indicates the TCI state information, including therein the information of the plurality of CSI-RS IDs and each kind of polarization.

Terminal 200 may determine any of indication methods A to C described above based on, for example, the number of sets of the reference signal (e.g., SSB or CSI-RS) indicated in the TCI state and the reference signal (e.g., CSI-RS) indicated in the TCI state, and QCL type indicated in the TCI state. In other words, terminal 200 may determine a method for using the polarization (e.g., reuse or polarization multiplex transmission) based on the TC state.

Incidentally, the TCI state information may be indicated in the RRC message (e.g., RRC reconfiguration message) or the MAC CE instead of the DCI. When the TCI state is indicated in the RRC-message or MAC CE, terminal 200 will continue to use the polarization indicated by the MAC CE for a certain period. Base station 100 may, for example, indicate the TC state by the RRC message or MAC CE upon the handover or beam switching (beam defined by SSB). Alternatively, for example, base station 100 may indicate a plurality of candidates for the TCI state available in the RRC message and may validate (activate) the TCI state to be used by the MAC CE. Further, base station 100 may select a TC state for each data allocation from among the plurality of TCI states indicated in the RRC message or MAC CE, and indicate the selected TCI state to terminal 200 by the DCI In the example illustrated in FIG. 15, the case has been described where QCL Type E corresponding to the polarization is defined, but for example, the polarization may be included in the channel characteristics corresponding to at least one of QCL Types A to D.

<Indication by Precoding Information>

For example, polarization may be indicated by "Precoding information" indicated in the DCI.

For example, the polarization may be indicated in three states in the Precoding Information for two antenna ports as specified in Table 7. 3.1.1.2-4 in 3GPP TS 38.212 V15.6.0 (see, e.g., FIG. 17).

For example, as illustrated in FIG. 17, the RHCP may be indicated when a bit-field (Bit field mapped to index) is '0,' the LHCP may be indicated when the bit-field is '1,' and multiplex transmission of both the RHCP and the LHCP may be indicated when the bit-field is '2.'

For example, terminal 200 determines the polarization corresponding to a value indicated in the bit-field (bit value) of the Precoding information illustrated in FIG. 17 as polarization of the radio signal. In other words, terminal 200 replaces the information indicated by the Precoding information with the polarization information.

<Indication by Antenna Port>

For example, as specified in Table 7. 3.1.2.2-1 to Table 7. 3.1.2.2-4 of 3GPP TS 38.212 V15.6.0, information on an antenna port is indicated by the DCI in four to six bits. The polarization may be indicated by this indication of the antenna port. In one example, the polarization may be indicated by the indication of antenna port number, in advance associating antenna port number with the polarization. Alternatively, the polarization may be indicated by a value of a "Antenna port (s)" field to be indicated by the DCI. Meanwhile, the amount of indication information may be reduced by determining in advance the first layer as the RHCP and the second layer as the LHCP when antenna ports of the two layers are indicated. Terminal 200 performs transmission by using the polarization that is specified by replacing the antenna port information with the polarization information.

As described above, a description has been given of the examples of the indication methods by the polarization-indicating bit. TCI state, Precoding information, and antenna port indication-indicating bit.

These indication methods make it possible to, for example, flexibly perform the indication of polarization by utilizing the existing indication mechanism.

Further, for example, base station 100 may indicate the polarization by a DCI (e.g., transmitted in PDCCH) indicating the assignment of Msg. 2. This indication allows terminal 200 to use the indicated polarization in, for example, communication after Msg. 2.

Further, the method for indicating the polarization by the DCI is not limited to these methods, and the polarization information may be indicated by another bit in the DCI. Alternatively, the polarization-indicating bit may be indicated by using, for example, using a terminal group-common (Group Common) DCI such as DCI format 2, in addition to, for example the DCI used for the data allocation. This allows base station 100 to indicate the polarization information to the terminal group at the same time, and thus, the overhead in the control-information can be reduced.

The polarization information indicated by the DCI may also be valid information for the PDSCH or PUSCH to be assigned by the DCI, and may be valid information for the channel or signal to be assigned to terminal 200 until an indication of polarization information with a different content is made for terminal 200 after the DCI indication.

Thus, in Method 3, for example, terminal 200 determines the fixed polarization as polarization to be used in radio communication until the reception of the DCI, and determines the polarization indicated by the DCI received from base station 100 as polarization to be used in radio communication after the reception of the DCI.

The polarization indicated by the DCI allows base station 100 to flexibly set polarization for each terminal 200 or each kind of data, so that inter-cell interference (or referred to as inter-beam interference) can be suppressed, for example. In addition, since the polarization can be set for each terminal 200 or each kind of data, it is possible to improve the throughput by, for example, the polarization multiplex transmission among terminals 200 or the polarization multiplex transmission in the same terminal 200.

Methods 1 to 3 have been each described, thus far.

As described above, in the present embodiment, base station 100 and terminal 200 determine, for example, the polarization used in the radio communication at least part of initial access (e.g., corresponding to the first phase) and in the radio communication after the part of the initial access (e.g., corresponding to the second phase).

For example, terminal 200 can receive a signal with a reception method according to the fixed polarization (e.g., previously-defined polarization) by determining the fixed polarization as polarization for the channel or signal in the initial access (e.g., SSB and SIB). Thus, in terminal 200, for example, it is possible to reduce the processing amount by suppressing the complexity of communication processing, which can improve the reception performance. In addition, for example, terminal 200 can reduce signaling indicating the polarization information, based on the fixed polarization.

Further, in the present embodiment, for example, terminal 200 sets the polarization indicated from base station 100 for the channel or signal used for user data occupying more time resources or frequency resources as compared to the initial access.

Terminal 200 can perform the communication processing based on the communication method according to the polarization to be set for terminal 200 (e.g., at least one of transmission and reception) by using the previously determined polarization or the polarization indicated from base station 100, and thus, the communication performance of terminal 200 can be improved.

Further, terminal 200 can determine the method for using the polarization (e.g., either reuse and polarization multiplex transmission) by means of the indication of polarization, and thus, for example, it is possible to avoid interference by reusing the polarization and to improve the throughput by the polarization multiplex transmission.

Hence, according to the present embodiment, the resource (e.g., polarization) used for communication in terminal 200 can be appropriately determined.

Incidentally, the fixed polarization may be previously defined in the standard or may freely set by an operation, for example. In a case of operational configuration, terminal 200 may detect the polarization by the blind determination at the time of initial connectivity and then wait for the signal with the same polarization.

Embodiment 2

Configurations of a base station and a terminal according to the present embodiment may be common to the configurations of base station 100 and terminal 200 according to Embodiment 1.

In the present embodiment, polarization to be set for each cell and identification information for a cell (e.g., also referred to as cell ID or Physical Cell ID (PCI)) are associated with each other.

For example, terminal 200 detects a PSS and SSS in an SSB in an SSB search at the time of initial access and specifies the cell ID. Thereafter, terminal 200 receives PBCH in the SSB and acquires system information to be broadcasted in the cell.

In the present embodiment, terminal 200 may set polarization associated with the cell ID in, for example, the SSB search (or after the SSB search).

For example, regarding the association between the cell ID and the polarization, as an example, an even cell ID and an odd cell ID may be associated with RHCP and LHCP, respectively. That is, the cell ID with the least significant bit 0 and the RHCP may be associated, and the cell ID with the least significant bit 1 and the LHCP may be associated. Incidentally, associations between even and odd cell IDs, and RHCP and LHCP, may be set reversely.

Alternatively, for example, among the cell IDs, a cell ID with a number in a smaller range (e.g., cell ID in the first half) and the RHCP may be associated, and a cell ID with a number in a larger range (e.g., cell ID in the second half) and the LHCP with each other, respectively. That is, the cell ID with the most significant bit 0 and the RHCP may be associated, and the cell ID with the most significant bit 1 and the LHCP may be associated.

Figure 18:
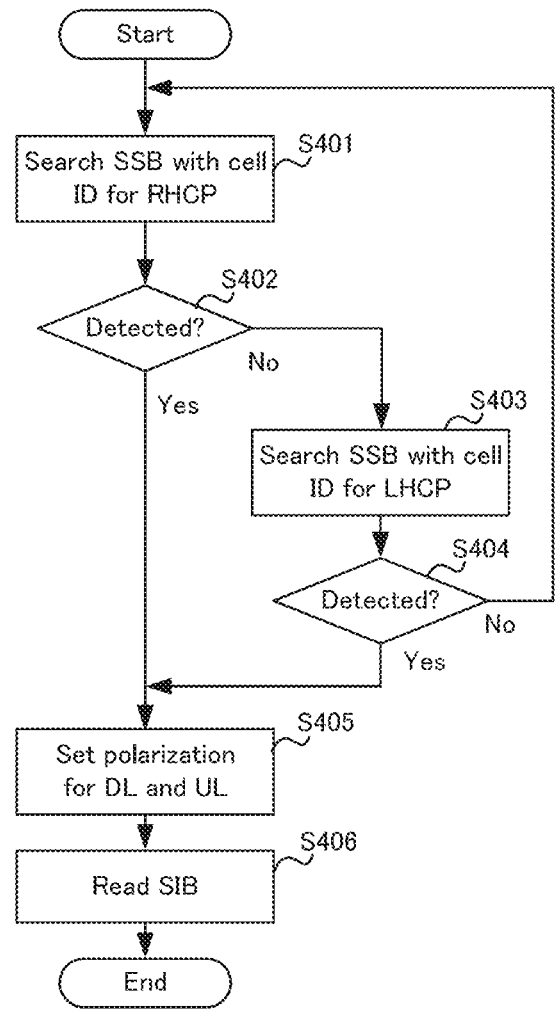
FIG. 18 is a flowchart illustrating an operation example of a terminal according to Embodiment 2.

FIG. 18 is a flowchart illustrating exemplary processing of terminal 200 according to the present embodiment.

For example, in the SSB search, terminal 200, for example, performs reception using the RHCP in detecting the PSS or SSS for the cell ID corresponding to the RHCP (S401). In a case where the cell ID corresponding to the RHCP is detected (S402: Yes), terminal 200 sets the RHCP as, for example, polarization used for reception processing (i.e., processing in downlink) and transmission processing (i.e., processing in uplink) (S405).

On the other hand, in a case where the PSS or SSS for the cell ID corresponding to the RHCP is not detected (S402: No), terminal 200 performs reception using the LHCP in detecting the PSS or SSS for the cell ID corresponding to the LHCP (S403). In a case where the cell ID corresponding to the LHCP detected (S404: Yes), terminal 200 sets the LHCP as, for example, polarization used for reception processing (i.e., processing in downlink) and transmission processing (i.e., processing in uplink) (S405).

For example, in a case where the SSB is not detected (S404: No), terminal 200 returns to the processing in S401 and repeats searching for the SSB.

Terminal 200 then receives the SIB based on, for example, the polarization set on the basis of the cell ID (S406).

Thus, in the present embodiment, detection of a cell ID in the cell search enables terminal 200 to determine the polarization associated with the cell ID. Therefore, base station 100 need not to indicate the polarization information, which makes it possible to reduce the signaling overhead of the control information for the indication of the polarization information.

Further, in the present embodiment, for example, since communication can be performed based on the polarization on the basis of the cell ID even for the SSB, interference can be avoided by using polarization in more channels.

In FIG. 18, the case has been described where terminal 200 performs the reception processing of the PSS or SSS (e.g., processing in S401 or S404 of FIG. 18) based on the polarization associated with the cell ID to be searched at the time of SSB search, but the present disclosure is not limited to this example. For example, terminal 200 may identify the cell ID by the SSB search and determine the polarization associated with the specified cell ID as polarization to be used in communication after the detection of the cell ID (e.g., after reception of PBCH included in SSB). In this case, as in Embodiment 1, the fixed polarization (e.g., previously-defined polarization) may be set for the PSS and SSS, which are channels for specifying the cell ID, for example. The same polarization as in the PSS and SSS may be set also for the PBCH because the PBCH is transmitted in the same block as the PSS and SSS.

Embodiment 3

Configurations of a base station and a terminal according to the present embodiment may be common to the configurations of base station 100 and terminal 200 according to Embodiment 1.

In the present embodiment, polarization set for each beam and identification information for an SSB corresponding to the beam (e.g., also referred to as SSB ID or SSB index) are associated with each other.

For example, in the present embodiment, terminal 200 may set the polarization associated with the SSB ID of the detected SSB.

For example, an even SSB ID and an odd SSB ID may be associated with RHCP and LHCP, respectively. That is, the SSB ID with the least significant bit 0 and the RHCP may be associated, and the SSB ID with the least significant bit 1 and the LHCP may be associated. Incidentally, associations between even and odd SSB IDs, and RHCP and LHCP, may be set reversely.

Alternatively, for example, among the SSB IDs, an SSB ID with a number in a smaller range (e.g., SSB ID in the first half) and the RHCP may be associated, and an SSB ID with a number in a larger range (e.g., SSB ID in the second half) and the LHCP with each other, respectively. That is, the SSB ID with the most significant bit 0 and the RHCP may be associated, and the SSB ID with the most significant bit 1 and the LHCP may be associated.

Here, for example, in NR Rel 15, a high-order bit side of the SSB ID (Most Significant Bit: MSB) is indicated by PBCH DMRS (i.e., reference signal used for PBCH demodulation), and low-order bit side of the SSB ID (Least Significant Bit. LSB) is indicated by a data part of the PBCH. For example, terminal 200 can identify the MSB side of the SSB ID upon detecting the PBCH DMRS. By contrast, terminal 200 cannot identify the LSB of the SSB ID until decoding and analyzing the data part of the PBCH.

Thus, for example, the indication of polarization may be associated with the high-order bit side of the SSB ID (e.g., MSB). This association allows terminal 200 to determine the polarization associated with the SSB ID prior to decoding the data part of the PBCH and thereby to receive the data part of the PBCH based on the polarization dedicated to the cell or beam.

Figure 19:
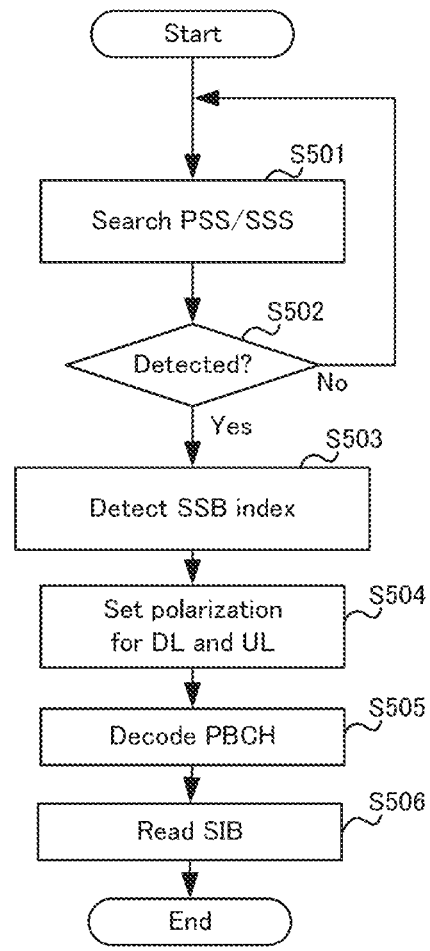
FIG. 19 is a flowchart illustrating an operation example of a terminal according to Embodiment 3.

FIG. 19 is a flowchart illustrating exemplary processing of terminal 200 according to the present embodiment.

Terminal 200, for example, searches for (in other words, detects) a PSS or SSS included in the SSB (S501). In the detection of the PSS or SSS, terminal 200 may be based on fixed polarization, may switch no-polarization, the RHCP, and the LHCP to search (i.e., blind determine), or may search by polarization diversity reception, for example.

For example, in a case where the PSS or SSS is not detected (S502: No), terminal 200 returns to the processing in S501 and repeats searching for the PSS or SSS.

In a case where the PSS or SSS is detected (S502: Yes), terminal 200 detects the SSB ID (or SSB index) (S503). Terminal 200 may detect the SSB ID (e.g., high-order bit of SSB ID) from, for example, the PBCH DMRS and may detect the SSB ID (e.g., low-order bit of SSB ID) from the data part of the PBCH.

Terminal 200 sets the polarization associated with the detected SSB ID as, for example, polarization used for reception processing (i.e., processing in downlink) and transmission processing (i.e., processing in uplink) (S504).

Terminal 200 then decodes data of the PBCH (S505) and receives the SIB (S506) based on, for example, the set polarization.

Thus, in the present embodiment, detection of an SSB ID enables terminal 200 to determine the polarization associated with the SSB ID. Therefore, base station 100 need not to indicate the polarization information, which makes it possible to reduce the signaling overhead of the control information for the indication of the polarization information.

Further, in the present embodiment, for example, communication can be performed based on the polarization on the basis of the SSB ID even for processing in an initial access after detection of the SSB ID (e.g., reception of PBCH or SIB). In one example, when the MSB of the SSB ID and the polarization are associated with each other, terminal 200 can perform communication processing based on the polarization associated with the SSB ID in processing after the reception of the data part of the PBCH. Meanwhile, for example, when the LSB of the SSB ID and the polarization are associated with each other, terminal 200 can perform communication processing based on the polarization associated with the SSB ID in processing after the reception of the SIB. Thus, according to the present embodiment, interference can be avoided by using polarization in more channels.

The embodiments of the present disclosure have been each described above.

Incidentally, satellite communication systems include "Regenerative type" in which functions of a base station are present in a satellite and "Transparent type" in which functions of a base station are present in a terrestrial GW and a satellite receives a signal from the GW and converts and amplifies the signal to transmit it. An exemplary embodiment of the present disclosure is applicable to any of the Regenerative type and the Transparent type.

Note that, in the above-described embodiments, the cell may be an area defined by the reception power of an SSB or a CSI-RS transmitted by the base station (satellite), or may be an area defined by the geographical position.

Further, in the above embodiments, the polarization is circular polarization as an example, but the polarization may be other polarization such as linearly polarization (e.g., at least one of vertical polarization and horizontal polarization) or elliptical circular polarization.

Further, the above embodiments (and methods) may be combined. For example, base station 100 may indicate polarization per cell based on Embodiment 2 and may indicate polarization for each terminal 200 based on Method 3 in Embodiment 1. In addition, for example, as the method for indicating the polarization according to Embodiment 1, base station 100 may indicate the polarization information for the downlink data by the TC state based on Method 3 and may indicate the polarization information for the uplink data by the Precoding information based on Method 3. Moreover, for example, the downlink data may be set in units of cells based on Embodiment 2, and the uplink data may be set by the DCI indication based on Method 3 in Embodiment 1.

Further, in the above embodiments, terminal 200 may save the polarization information detected by the blind determination or the indicated polarization information in the initial access, and thereafter, terminal 200 may set polarization to be used for transmission and reception based on the saved polarization information when, for example, the power of terminal 200 is turned off or it enters the RRC_IDLE state.

Note that, the embodiments described above have been described by taking the NTN environment (e.g., satellite communication environment) as an example, but the present disclosure is not limited to this. The present disclosure may be applied to other communication environments (e.g., terrestrial cellular environment in LTE and/or NR).

Further, in the embodiments described above, the case has been described where, for example, terminal 200 sets the fixed polarization in the period prior to receiving the indication of polarization information and sets the polarization based on the indication in the period after receiving the indication of polarization information, but the present disclosure is not limited to this case. For example, terminal 200 may apply the polarization indicated from base station 100 to at least one channel or signal after receiving the indication of polarization information. In one example, terminal 200 may set the polarization indicated by the SIB for communication of the user data without setting it to the RACH procedures. In this case, terminal 200 may set, for example, the fixed polarization for the RACH procedures. Further, for example, terminal 200 may switch the fixed polarization and polarization indicated from base station 100, depending on the channel or signal type.

Further, in the embodiments described above, the case has been described where the polarization (e.g., fixed polarization and polarization indicated from base station 100) is set in both the initial access and the processing after the initial access in terminal 200, but the present disclosure is not limited to this case. For example, in terminal 200, the polarization may be applied to at least one of the initial access and the processing after the initial access. In one example, the polarization may not be applied to the initial access while being applied to the processing after the initial access. As another example, the polarization may not be applied to the processing until the polarization information is indicated from base station 100 while being applied to the process after the polarization information is indicated from base station 100.

Further, the polarization information may be indicated only by a satellite, base station, or radio system that uses the polarization. Additionally, the information may be indicated only to the NTN or a terminal with ability (capability) for satellite communication, based on the indication of terminal capability from the terminal. The capability of the terminal may be indicated, from the terminal to the base station, by UE capability. UE feature. Subscriber Profile ID, and the like.

Further, the term "terminal" in each of the embodiments described above may be replaced with the term "UE." Further, the term "base station" may be replaced with the term "eNodeB," "eNB," "gNodeB," or "gNB."

In addition, the term, such as "part" or "portion" or the term ending with a suffix, such as "-er" "or" or "-ar" in the above-described embodiment may be replaced with another term, such as "circuit (circuitry)," "device." "unit," or "module."

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI herein may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing.

If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. The communication apparatus may comprise a transceiver and processing/control circuitry. The transceiver may comprise and/or function as a receiver and a transmitter. The transceiver, as the transmitter and receiver, may include an RF (radio frequency) module and one or more antennas. The RF module may include an amplifier, an RF modulator/demodulator, or the like. Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)."

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as, e.g., a base station, an access point, and any other apparatus, device or system that communicates with or controls apparatuses such as those in the above non-limiting examples.

A terminal according to an exemplary embodiment of the present disclosure includes: control circuitry, which, in operation, determines polarization to be used in at least one of first radio communication and/or second radio communication which is after the first radio communication: and communication circuitry, which, in operation, performs the at least one of the first radio communication and/or the second radio communication by using the determined polarization.

In an exemplary embodiment of the present disclosure, the control circuitry determines previously-defined polarization, as the polarization to be used in the first radio communication.

In an exemplary embodiment of the present disclosure, the control circuitry determines the polarization to be used in the second radio communication, based on information received from a base station.

In an exemplary embodiment of the present disclosure, the information is system information; and the control circuitry determines polarization indicated by the system information, as the polarization to be used in the second radio communication after reception of the system information.

In an exemplary embodiment of the present disclosure, the information is a terminal-dedicated higher layer signaling; and the control circuitry determines polarization indicated by the higher layer signaling, as the polarization to be used in the second radio communication after reception of the higher layer signaling.

In an exemplary embodiment of the present disclosure, the information is downlink control information; and the control circuitry determines polarization indicated by the downlink control information, as the polarization to be used in the second radio communication after reception of the downlink control information.

In an exemplary embodiment of the present disclosure, the polarization indicated by the downlink control information is indicated by downlink transmission configuration information or information on precoding.

In an exemplary embodiment of the present disclosure, the information is identification information for a cell: and the identification information for the cell and the polarization are associated with each other.

In an exemplary embodiment of the present disclosure, the information is identification information for a synchronization signal corresponding to a beam; and the identification information for the synchronization signal and the polarization are associated with each other.

In an exemplary embodiment of the present disclosure, the polarization is associated with a bit included a reference signal for demodulating a broadcast channel, among a plurality of bits constituting the identification information for the synchronization signal.

A communication method according to an exemplary embodiment of the present disclosure includes: determining, by a terminal, polarization to be used in at least one of first radio communication and/or second radio communication which is after the first radio communication; and performing, by the terminal, the at least one of the first radio communication and/or the second radio communication by using the determined polarization.

The disclosure of Japanese Patent Application No. 2019-202108 filed on Nov. 7, 2019 including the specification, drawings and abstract is incorporated herein by reference in its entirety.

INDUSTRIAL APPLICABILITY

An aspect of the present disclosure is useful for radio communication systems.

REFERENCE SIGNS LIST

100 Base station
101, 204 Controller
102, 205 Data generator
103, 206 Transmission data processor
104, 207 Radio transmitter
105, 201 Antenna
106, 202 Radio receiver
107, 203 Received data processor
200 Terminal

The invention claimed is:
1. A terminal, comprising:
a receiver, which, in operation,
receives, from a base station, polarization information used for downlink and uplink transmission of Non-Terrestrial Network (NTN) radio communication, and
receives, from the base station, a handover message,
the polarization information indicating polarization selected from a set including left handed circular polarization (LHCP), right handed circular polarization (RHCP), and linear polarization; and
communication circuitry, which, in operation,
performs the NTN radio communication by using the polarization indicated in the polarization information,
determines polarization used in a neighboring cell based on polarization information of the neighboring cell included in the handover message received from the base station, and
performs a radio measurement of the neighboring cell by using the polarization information of the neighboring cell, wherein the NTN radio communication comprises first NTN radio communication and second NTN radio communication that is after the first NTN radio communication,
the first NTN radio communication is the downlink transmission, and the second NTN radio communication is the uplink transmission,
the communication circuitry, in operation, uses, in the first NTN radio communication, defined polarization, and
the communication circuitry, in operation, uses the polarization in the second NTN radio communication indicated in the polarization information by the first NTN radio communication.

2. The terminal according to claim 1, wherein:
the polarization information is system information; and
the communication circuitry, in operation, uses the polarization indicated by the system information.

3. The terminal according to claim 1, wherein:
the polarization information of the neighboring cell is signaled with channel state information reference signal (CSI-RS) information.

4. The terminal according to claim 1, wherein:
the polarization information is a terminal-dedicated higher layer signaling; and
the communication circuitry, in operation, uses the polarization indicated by the terminal-dedicated higher layer signaling in the NTN radio communication after reception of the terminal-dedicated higher layer signaling.

5. The terminal according to claim 1, wherein:
the polarization information is downlink control information; and
the communication circuitry, in operation, uses the polarization indicated by the downlink control information in the NTN radio communication after reception of the downlink control information.

6. The terminal according to claim 5, wherein:
the downlink control information which indicates the polarization is downlink transmission configuration information or information on precoding.

7. The terminal according to claim 1, wherein:
the polarization information is identification information of a cell; and
the identification information of the cell and the polarization are associated with each other.

8. The terminal according to claim 1, wherein:
the polarization information is identification information of a synchronization signal corresponding to a beam; and
the identification information of the synchronization signal and the polarization are associated with each other.

9. The terminal according to claim 8, wherein:
the polarization is associated with a bit included in a reference signal for demodulating a broadcast channel, among a plurality of bits constituting the identification information of the synchronization signal.

10. A communication method performed by a terminal, the communication method comprising:
receiving, from a base station, polarization information used for downlink and uplink transmission of Non-Terrestrial Network (NTN) radio communication, the polarization information indicating polarization selected from a set including left handed circular polarization (LHCP), right handed circular polarization (RHCP), and linear polarization;
receiving, from the base station, a handover message;
performing the NTN radio communication by using the polarization indicated in the polarization information;

determining polarization used in a neighboring cell based on polarization information of the neighboring cell included in the handover message received from the base station; and performing a radio measurement of the neighboring cell by using the polarization information of the neighboring cell, wherein the NTN radio communication comprises first NTN radio communication and second NTN radio communication that is after the first NTN radio communication, the first NTN radio communication is the downlink transmission, and the second NTN radio communication is the uplink transmission, the terminal uses, in the first NTN radio communication, defined polarization, and the terminal uses the polarization in the second NTN radio communication indicated in the polarization information by the first NTN radio communication.

11. A base station, comprising:

a transmitter, which, in operation, transmits, to a terminal, polarization information indicative of polarization used for downlink and uplink transmission of Non-Terrestrial Network (NTN) radio communication with the terminal, and transmits, to the terminal, a handover message, the polarization selected from a set including left handed circular polarization (LHCP), right handed circular polarization (RHCP), and linear polarization; and communication circuitry, which, in operation, performs the NTN radio communication by using the polarization, wherein polarization information of a neighboring cell included in the handover message transmitted to the terminal indicates polarization used in the neighboring cell, and the polarization information of the neighboring cell is used by the terminal to perform a radio measurement of the neighboring cell, the NTN radio communication comprises first NTN radio communication and second NTN radio communication that is after the first NTN radio communication, the first NTN radio communication is the downlink transmission, and the second NTN radio communication is the uplink transmission, the terminal uses, in the first NTN radio communication, defined polarization, and the terminal uses the polarization in the second NTN radio communication indicated in the polarization information by the first NTN radio communication.

12. The base station according to claim 11, wherein:

the polarization information is transmitted in system information.

13. The base station according to claim 11, wherein:

the polarization information of the neighboring cell is signaled with channel state information reference signal (CSI-RS) information.

* * * * *